(12) United States Patent  
Kurokawa

(10) Patent No.: US 11,404,787 B2  
(45) Date of Patent: Aug. 2, 2022

(54) MAGNETIC-FIELD GENERATING CIRCUIT

(71) Applicant: Murata Manufacturing Co., Ltd., Nagaokakyo (JP)

(72) Inventor: Takashi Kurokawa, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 189 days.

(21) Appl. No.: 16/591,852

(22) Filed: Oct. 3, 2019

(65) Prior Publication Data  
US 2020/0036096 A1 Jan. 30, 2020

Related U.S. Application Data

(63) Continuation of application No. PCT/JP2018/014293, filed on Apr. 3, 2018.

(30) Foreign Application Priority Data

Apr. 6, 2017 (JP) .............................. JP2017-085696  
Jul. 21, 2017 (JP) .............................. JP2017-142059

(51) Int. Cl.  
*H01Q 7/00* (2006.01)  
*B60R 25/24* (2013.01)  
(Continued)

(52) U.S. Cl.  
CPC .............. *H01Q 7/00* (2013.01); *B60R 25/24* (2013.01); *H02M 1/08* (2013.01); *H02M 7/537* (2013.01)

(58) Field of Classification Search  
CPC ...... H02M 7/537; H02M 1/08; H02M 7/4815; H02M 7/538; B60R 25/24; H01Q 7/00; Y02B 70/10  
See application file for complete search history.

(56) References Cited

U.S. PATENT DOCUMENTS 2,854,665 A * 9/1958 Brown .................... H04B 1/58  
370/339  
4,573,184 A * 2/1986 Tanaka .................... H05G 1/34  
363/28  
(Continued)

FOREIGN PATENT DOCUMENTS

CN 101783525 A 7/2010  
CN 105281553 A 1/2016  
(Continued)

OTHER PUBLICATIONS

International Search Report issued in PCT/JP2018/014293, dated Jul. 3, 2018.  
(Continued)

*Primary Examiner* — Graham P Smith  
*Assistant Examiner* — Jae K Kim  
(74) *Attorney, Agent, or Firm* — ArentFox Schiff LLP

(57) ABSTRACT

A magnetic-field generating circuit includes a transformer antenna that includes a transformer including a primary coil and a secondary coil and a resonant capacitor connected in parallel to the secondary coil of the transformer and that generates a magnetic field. Moreover, an AC power supply circuit is provided that supplies an AC voltage serving as a driving voltage to the primary coil of the transformer antenna. The secondary coil and the resonant capacitor form a parallel resonant circuit whose resonant frequency is set to be equal to a frequency of the AC voltage supplied from the AC power supply circuit.

15 Claims, 24 Drawing Sheets

(51) Int. Cl.
*H02M 1/08* (2006.01)
*H02M 7/537* (2006.01)

(56) References Cited

U.S. PATENT DOCUMENTS

| | | | | |
|---|---|---|---|---|
| 5,434,767 | A * | 7/1995 | Batarseh | H02M 3/33569 |
| | | | | 363/16 |
| 5,661,369 | A * | 8/1997 | Sanderson | H02H 9/028 |
| | | | | 315/105 |
| 6,329,808 | B1 * | 12/2001 | Enguent | H04B 5/0012 |
| | | | | 324/650 |
| 8,730,120 | B2 | 5/2014 | Deguchi et al. | |
| 8,766,483 | B2 * | 7/2014 | Cook | H02J 50/50 |
| | | | | 307/104 |
| 2006/0273888 | A1 | 12/2006 | Yamamoto | |
| 2006/0279972 | A1 * | 12/2006 | Shao | H02M 3/33592 |
| | | | | 363/127 |
| 2009/0261844 | A1 * | 10/2009 | Howard | G01D 5/2026 |
| | | | | 324/654 |
| 2010/0109443 | A1 | 5/2010 | Cook et al. | |
| 2010/0181963 | A1 | 7/2010 | Schreiber | |
| 2012/0119965 | A1 * | 5/2012 | Deguchi | H01Q 7/00 |
| | | | | 343/788 |
| 2013/0300209 | A1 | 11/2013 | Long et al. | |
| 2017/0250728 | A1 * | 8/2017 | Afsahi | H04B 1/44 |
| 2018/0108621 | A1 * | 4/2018 | Burton | H01L 24/09 |
| 2019/0198997 | A1 * | 6/2019 | Wanderoild | H01Q 7/00 |
| 2021/0344222 | A1 * | 11/2021 | Taipale | H05B 47/19 |
| 2021/0344271 | A1 * | 11/2021 | Tao | H02M 1/08 |
| 2022/0091174 | A1 * | 3/2022 | Karin | G01R 15/22 |

FOREIGN PATENT DOCUMENTS

| | | | | |
|---|---|---|---|---|
| CN | 105896750 | A | | 8/2016 |
| CN | 106451575 | A | | 2/2017 |
| CN | 205921075 | U | * | 2/2017 |
| DE | 602004007013 | T2 | * | 2/2008 ........... H04B 5/0081 |
| JP | H05156851 | A | | 6/1993 |
| JP | 2001257526 | A | | 9/2001 |
| JP | 2006041652 | A | | 2/2006 |
| JP | 2006319846 | A | | 11/2006 |
| JP | 2012169724 | A | | 9/2012 |
| JP | 2016183489 | A | | 10/2016 |
| WO | 2015129460 | A1 | | 9/2015 |
| WO | WO-2019065496 | A1 | * | 4/2019 ............... H01Q 7/08 |

OTHER PUBLICATIONS

Written Opinion of the International Searching Authority issued in PCT/JP2018/014293, dated Jul. 3, 2018.

* cited by examiner

FIG. 3

APPLICATION OF SINE-WAVE VOLTAGE
(ACTUALLY MEASURED VALUES)

|  |  | Related art | First embodiment | First embodiment /Related art |
|---|---|---|---|---|
| Damping resistor | Ω | 10 | None | — |
| Turns ratio | — | — | 35 | — |
| Inductance | uH | 166 | 166 | — |
| Resonant capacitor | nF | 10 | 10 | — |
| Waveform of applied voltage |  | Sine wave | Sine wave | — |
| Driving frequency | kHz | 123 | 122 | — |
| Input voltage | Vpp | 12 | 12 | 100.0% |
| Input current | App | 1.14 | 0.24 | 21.1% |
| Input power | VA | 2.418305 | 0.509117 | 21.1% |
| Coil current | App | 1.14 | 1.74 | 152.6% |
| Spatial magnetic flux density at 1m | nTrms | 7.5 | 12.9 | 172.0% |

FIG. 4

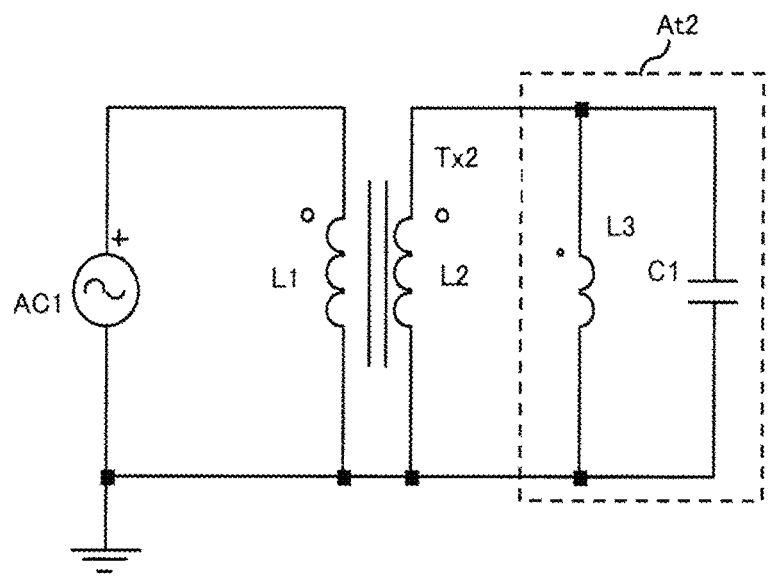

FIG. 5
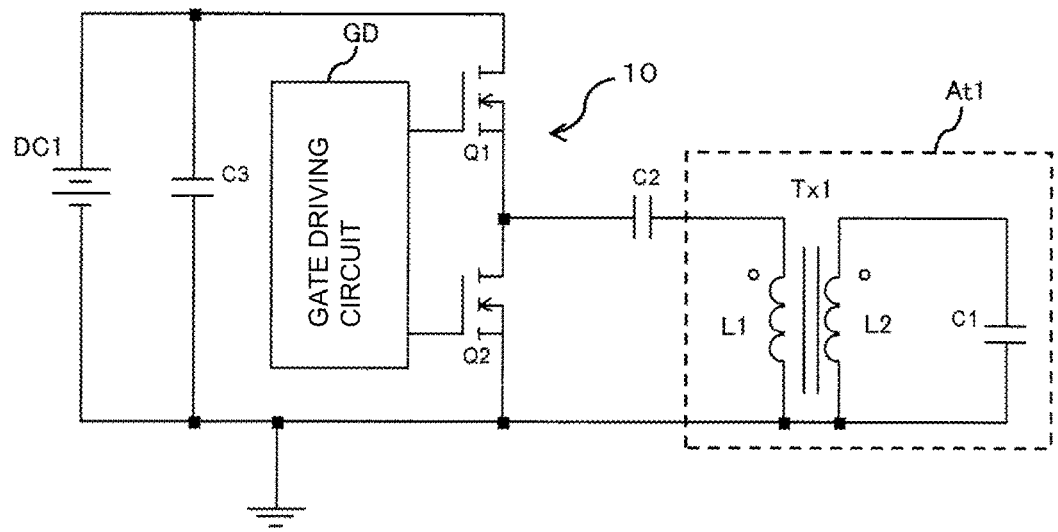
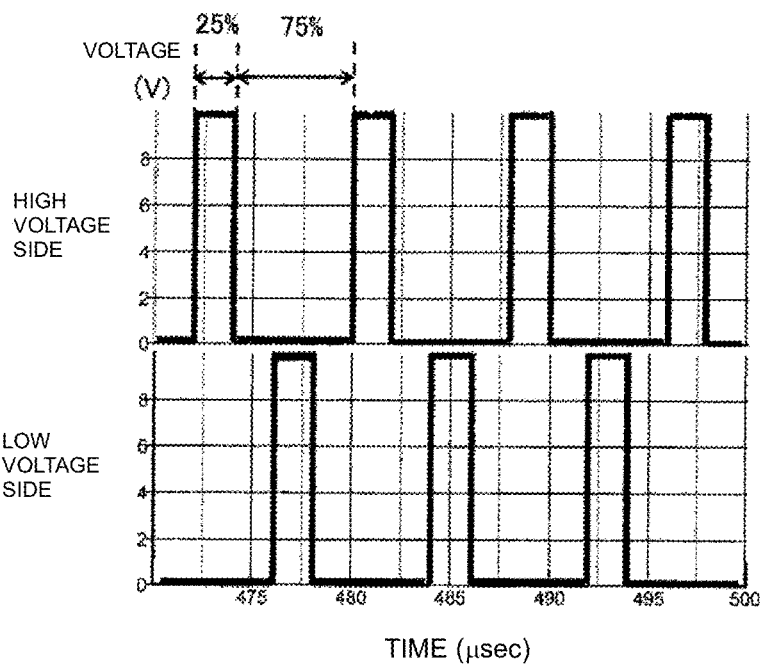
FIG. 6(A) HIGH VOLTAGE SIDE
FIG. 6(B) LOW VOLTAGE SIDE
TIME (μsec)

FIG. 7

DRIVING BY OPERATION OF HALF-BRIDGE CIRCUIT (SIMULATION VALUES)

| | | Third embodiment (No. 1) |
|---|---|---|
| Damping resistor | Ω | None |
| Turns ratio | — | 35 |
| Inductance | uH | 166 |
| Resonant capacitor | nF | 10 |
| Waveform of applied voltage | | 25% Rectangular wave |
| Driving frequency | kHz | 125 |
| Input voltage | Vdc | 12 |
| Circuit input current | Arms | 0.014 |
| Transformer input current | App | 1.67 |
| | Arms | 0.251 |
| Coil current | App | 1.83 |
| | Arms | 0.636 |
| Magnetic flux density at 1m (Estimated value) | nTrms | 12.83 |

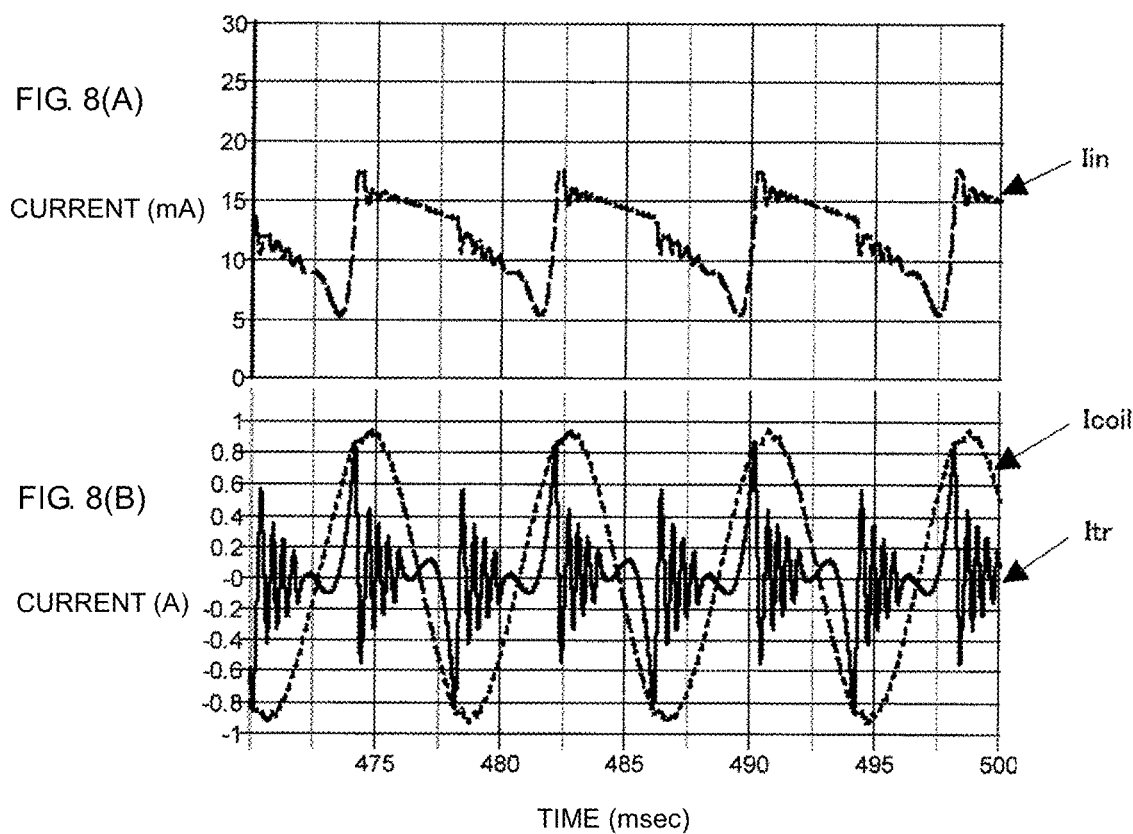

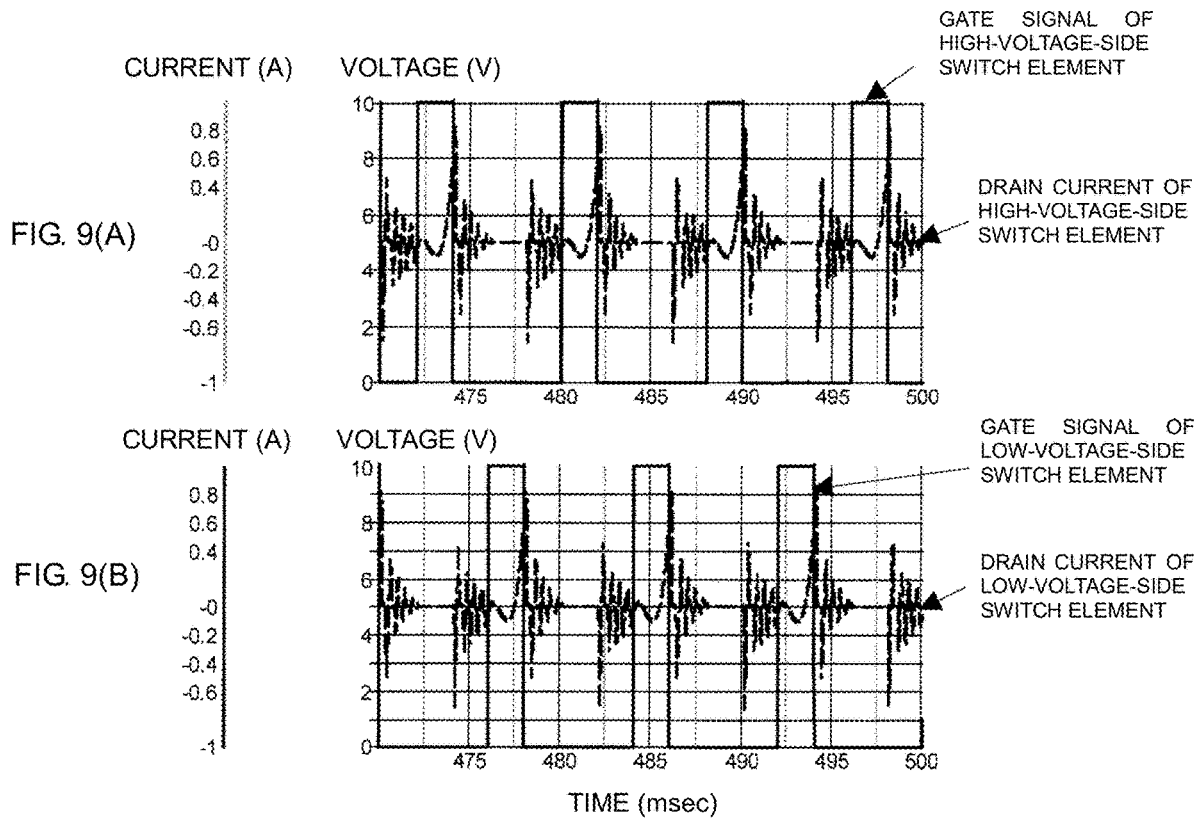

ACTUALLY MEASURED VALUES
IN HALF-BRIDGE DRIVING CIRCUIT

| | | Related art | Third embodiment (No. 2) | Third embodiment (No. 3) | No. 2/ Related art | No. 3/ Related art |
|---|---|---|---|---|---|---|
| Damping resistor | Ω | 10 | None | None | — | — |
| Turns ratio | — | — | 27 | 70 | — | — |
| Inductance | uH | 166 | 166 | 337 | — | — |
| Resonant capacitor | nF | 10 | 10 | 4.7 | — | — |
| Driving circuit | — | Half-bridge | ← (FIG. 5) | ← (FIG. 5) | — | — |
| Waveform of applied voltage | | 30% Rectangular wave | 25% Rectangular wave | 25% Rectangular wave | — | — |
| Driving frequency | kHz | 123 | 122 | 126.4 | — | — |
| Input voltage | V | 12 | 12 | 12 | — | — |
| Circuit input current | Arms | 0.147 | 0.034 | 0.062 | 23.1% | 42.2% |
| Input power | VA | 1.764 | 0.408 | 0.744 | 23.1% | 42.2% |
| Transformer input current | App | — | 1.14 | 1.02 | — | — |
| Coil current | App | 1.01 | 1.88 | 1.92 | 186.1% | 190.1% |
| | Arms | 0.357 | 0.665 | 0.679 | 186.1% | 190.1% |
| Spatial magnetic flux density at 1m | nTrms | 7.44 | 13.18 | 21.3 | 177.2% | 286.3% |
| Rise time of magnetic flux | uS | 80 | 70 | 70 | 87.5% | 87.5% |

FIG. 11

FREQUENCY CHARACTERISTICS DURING DRIVING BY HALF-BRIDGE CIRCUIT
(ACTUALLY MEASURED VALUES)

|  |  | Third embodiment (No. 2) | Third embodiment (No. 2) | Third embodiment (No. 2) |
|---|---|---|---|---|
| Damping resistor | Ω | None | ← | ← |
| Turns ratio | – | 27 | ← | ← |
| Inductance | uH | 166 | ← | ← |
| Resonant capacitor | nF | 10 | ← | ← |
| Driving circuit | – | Half-bridge (FIG. 5) | ← ← | ← ← |
| Waveform of applied voltage |  | 25% Rectangular wave | 25% Rectangular wave | 25% Rectangular wave |
| Driving frequency | kHz | 119 | 120.5 | 122 |
| Input voltage | V | 12 | 12 | 12 |
| Circuit input current | Arms | 0.119 | 0.068 | 0.034 |
| Input power | VA | 1.428 | 0.816 | 0.408 |
| Coil current | App | 1.64 | 1.82 | 1.88 |
| Spatial magnetic flux density at 1m | nTrms | 13.2 | 13.1 | 13.3 |

FIG. 12

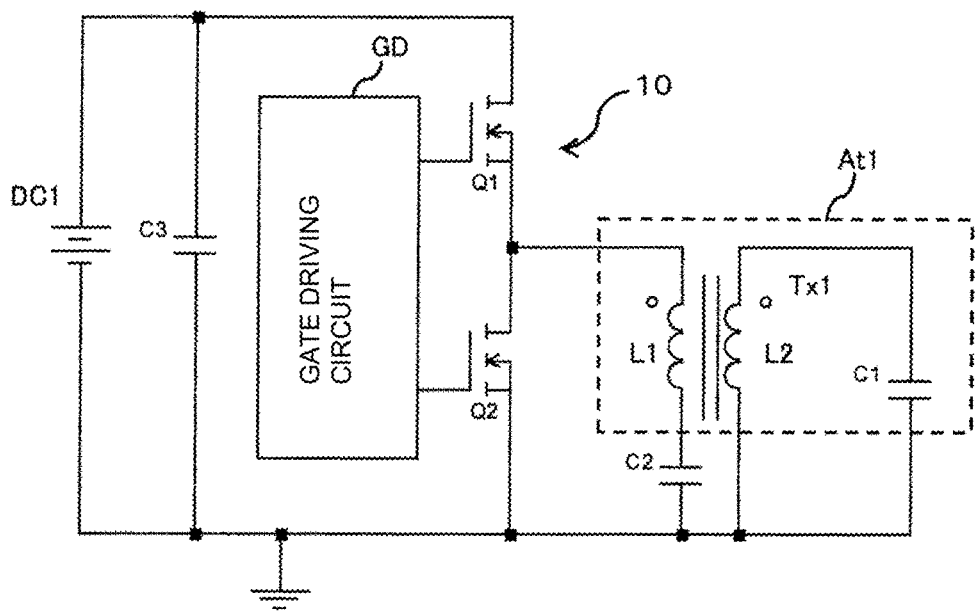

TIME (msec)

FIG. 17

COMPARISON OF OPERATION BETWEEN FULL-BRIDGE CIRCUIT AND HALF-BRIDGE CIRCUIT (SIMULATION)

|  |  | Third embodiment (No. 1) | Fourth embodiment | Fourth embodiment/ Third embodiment |
|---|---|---|---|---|
| Damping resistor | Ω | 10 | None | — |
| Turns ratio | — | 35 | 35 | 35 |
| Inductance | uH | 166 | 166 | — |
| Resonant capacitor | nF | 10 | 10 | — |
| Driving circuit | — | Half-bridge (FIG. 10a) | Full-bridge (FIG. 10b) | — |
| Waveform of applied voltage |  | 25% Rectangular wave | 25% Rectangular wave | — |
| Driving frequency | kHz | 125 | 125 | — |
| Input voltage | V | 12 | 12 | 100.0% |
| Circuit input current | Arms | 0.014 | 0.048 | 342.9% |
| Input power | VA | 0.168 | 0.576 | 342.9% |
| Transformer input current | App | 1.67 | 2.40 | 143.7% |
|  | Arms | 0.251 | 0.35 | 139.4% |
| Coil current | App | 1.83 | 3.618 | 197.7% |
|  | Arms | 0.636 | 1.264 | 198.7% |
| Magnetic flux density at 1m (Estimated value) | nTrms | 12.83 | 25.36 | 197.7% |

FIG. 18

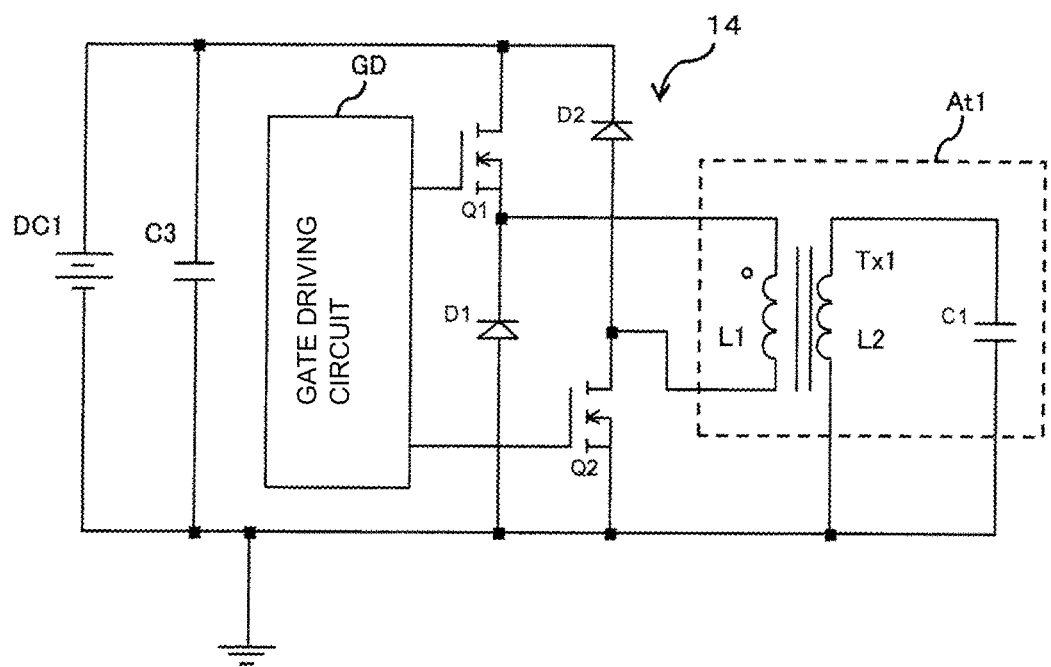

FIG. 26
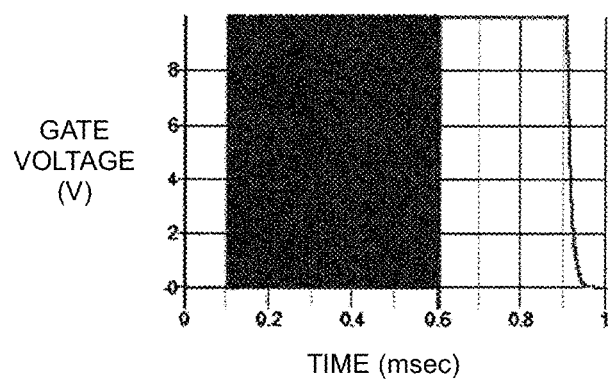
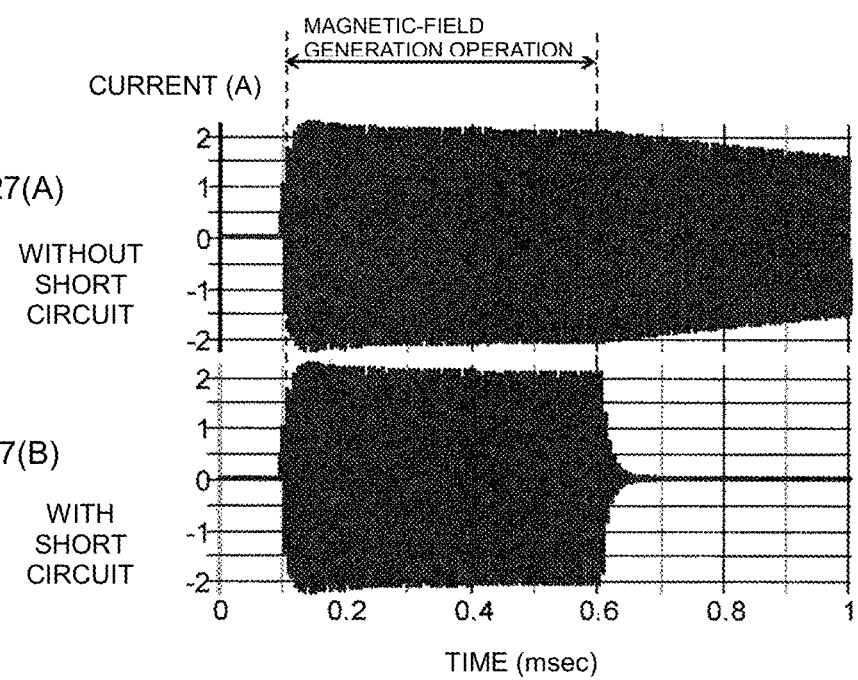
FIG. 27(A) WITHOUT SHORT CIRCUIT
FIG. 27(B) WITH SHORT CIRCUIT

FIG. 33(A) CURRENT (A)
WITHOUT DIODE

WITH DIODE

TIME (msec)

Prior Art
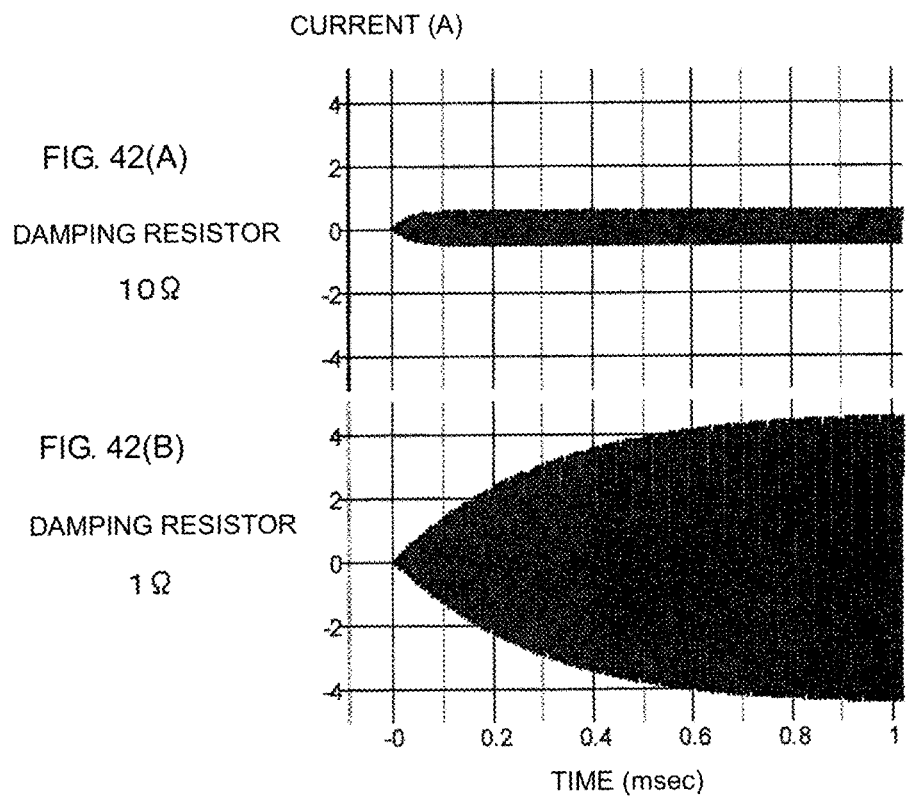
FIG. 42(A)
DAMPING RESISTOR
10 Ω
FIG. 42(B)
DAMPING RESISTOR
1 Ω
FIG. 43
Prior Art
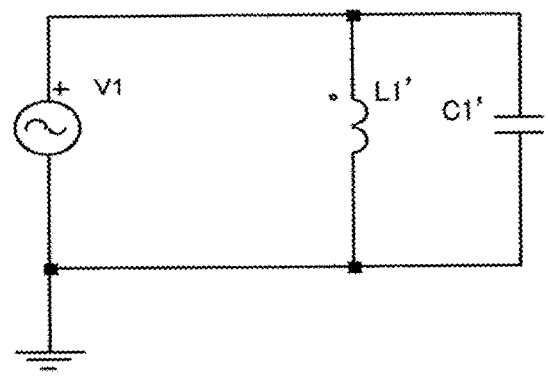

FIG. 44
Prior Art
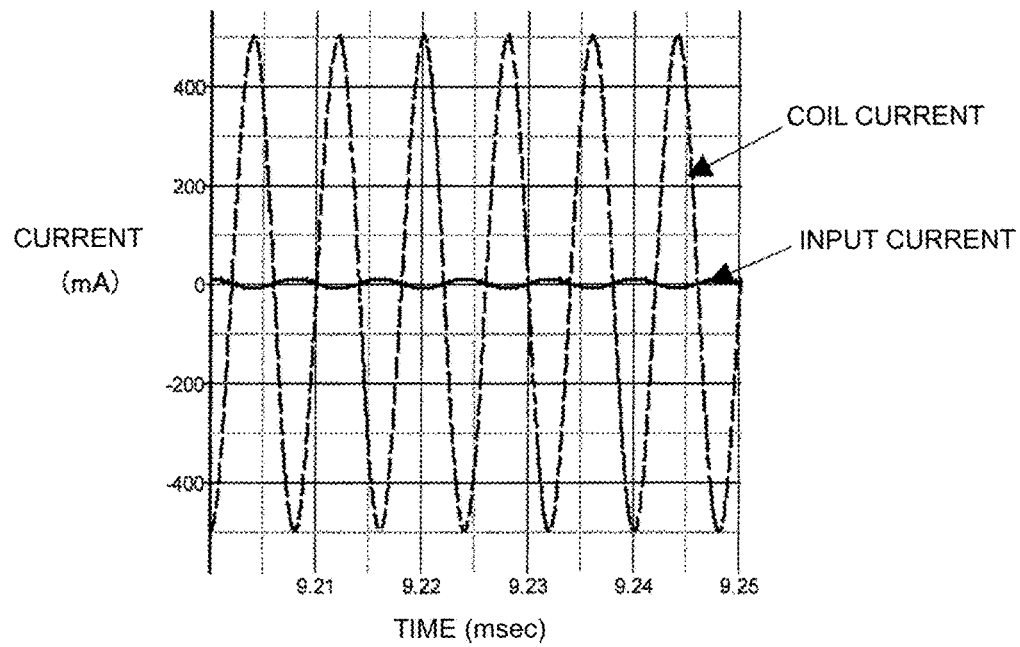
Prior Art
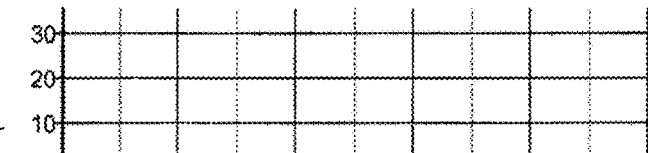
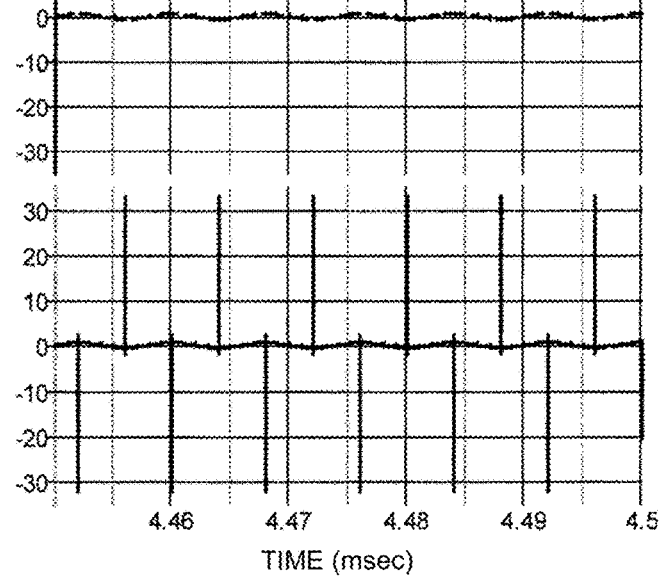

MAGNETIC-FIELD GENERATING CIRCUIT

CROSS REFERENCE TO RELATED APPLICATIONS

The present application is a continuation of PCT/JP2018/014293 filed Apr. 3, 2018, which claims priority to Japanese Patent Application No. 2017-085696, filed Apr. 6, 2017, and to Japanese Patent Application No. 2017-142059, filed Jul. 21, 2017, the entire contents of each of which are incorporated herein by reference.

TECHNICAL FIELD

The present invention relates to a magnetic-field generating circuit that generates a magnetic field for communication.

BACKGROUND

Communication systems called "keyless entry systems" for remotely unlocking or locking doors of automobiles or the like have been widely used. In recent years, near field communication systems called passive entry systems or smart entry systems using magnetic-field signals in the VLF band or LF band have been widely used in which automatic unlocking is performed when a remote control approaches a vehicle and automatic locking is performed when the remote control moves away from the vehicle.

As an example configuration of a passive keyless entry system, there is a configuration as disclosed in Patent Document 1 (identified below) in which a vehicle transmits a magnetic-field signal in the VLF band or LF band, a remote control receives the magnetic-field signal and transmits a radio-wave signal in a radio-frequency (RF) band, and the vehicle receives the RF signal and performs unlocking or locking.

A circuit for transmitting a magnetic-field signal uses a coil antenna including an inductor (coil) and a capacitor connected in series to each other and having a constant that makes a series resonant frequency equal to a signal frequency of a communication system. FIG. 40 illustrates an example of such a circuit for transmitting a magnetic-field signal. In the circuit illustrated in FIG. 40, when an alternating-current (AC) power supply AC0 is connected to a coil antenna with a resistor R1 interposed therebetween and an AC voltage V1 equal to a resonant frequency is applied, even a low voltage enables a large coil current to flow and a large magnetic-field output to be obtained. A combination of such a coil antenna and a driving system is particularly suitable for a near field communication system using a magnetic field and is adopted in almost all passive keyless entry systems.

A series resonant circuit has characteristics that a resonant current has a frequency characteristic with a resonant frequency as a peak and that time may be required until a current value reaches a maximum value.

A series resonant circuit has a frequency characteristic that a current reaches a maximum peak at a resonant frequency (generally the frequency steepness characteristic of a resonant circuit is represented by a Q value). Variation in components or the like makes it difficult to achieve complete matching between the resonant frequency and driving frequency of a product, and small variation in characteristics of the product results in a large difference in resonant current and difficulty in use. Thus, the resistor R1 (hereinafter referred to as a "damping resistor") is connected in series to the LC circuit as shown in FIG. 40. Accordingly, the above-mentioned Q value is decreased to make a frequency-current characteristic flat for enhanced usability.

When the resistance value of the damping resistor R1 in the series resonant circuit is represented by R1 and the inductance of a coil L1' is represented by L1', the time until a resonant current increases to a maximum value (hereinafter referred to as a "rise time") is substantially proportional to L1'/R1. In a passive keyless entry system, the rise time is an important factor to determine a communication speed. Connecting of the above-described damping resistor makes it possible to shorten the rise time. The value of the damping resistor is comprehensively determined from the frequency characteristic and rise time of a resonant current required for the system, and the characteristic values of L and C.

FIG. 41 illustrates the frequency characteristic of an input current and FIGS. 42(A) and 42(B) illustrate the current transient characteristic of the input current, in individual cases where R1 is 1Ω and 10 Ω when C1'=10 nF and L1'=162 μLH in the circuit illustrated in FIG. 40. It is understood from FIG. 41 that the frequency characteristic of the input current experiences a significant peak when the damping resistor R1 has 1Ω. In practical use, it is very difficult to adjust a change in current value caused by variation in characteristics of the LC circuit by using a driving circuit, and the current value is stabilized by limitations using the damping resistor.

It is further to be understood from FIGS. 42(A) and 42(B) that 1 second or more is taken for the input current (i.e., resonant current) to rise when the damping resistor R1 has 1Ω, but the rise time is shorter, that is, 10 μs, when the damping resistor R1 has 10Ω.

It can be confirmed from the above that a damping resistor is an essential component in a coil antenna driving system used in a magnetic-field communication system in the VLF band or LF band.

Patent Document 1: Japanese Unexamined Patent Application Publication No. 5-156851.

Patent Document 2: Japanese Unexamined Patent Application Publication No. 2001-257526.

In passive keyless entry systems according to the related art, the communication distance between a vehicle and a remote control key is about 1 m, but the application for a longer communication distance, for example, about 10 m, has been demanded in recent years. For example, there are a welcome light function of indicating the position of a vehicle with blinking of a lamp when a remote control holder approaches the vehicle, walkaway locking for performing automatic locking when a remote control holder moves about 10 m away from a vehicle, and an autonomous driving/parking function that operates only when it is determined that an owner is within a short distance of about 10 m from a vehicle.

To implement these functions, it is necessary to significantly increase a magnetic-field signal on the vehicle side. To increase a magnetic-field output (i.e., a spatial magnetic flux density) in an antenna system including a series resonant circuit, the following methods may typically be used:

Increase a coil current value (a spatial magnetic field intensity is substantially proportional to a current value).

Increase a coil inductance (a spatial magnetic field intensity is substantially proportional to the square root of an inductance ratio).

Increase the length of the core of a coil (a spatial magnetic field intensity is substantially proportional to the length of the core of a coil).

To increase a coil current, it is necessary to decrease the value of the above-described damping resistor or to increase an input voltage. However, it is impossible to decrease the value of the damping resistor because of the resonant characteristic of a current value and the purpose of shortening the rise time. In addition, an input voltage value is determined by the system voltage of a vehicle and cannot easily be increased in usual cases. Even if the voltage can be increased, the loss at the damping resistor increases with the square of the current value, and the necessity for increasing the current capacity of the damping resistor arises.

In a case where the inductance of a coil is increased, the current rise time is increased, and thus it is necessary to increase the damping resistance value to keep the rise time about the same. In this case, however, the current value decreases, and thus it is impossible to increase the magnetic field intensity.

From the above-described points, the third method to increase the length of the core of a coil to increase the magnetic flux density has typically been used. In the case of communication within about 1 m, a core with a length of 40 to 80 mm is enough to generate a magnetic field required for the system. However, intermediate-distance communication of 10 m requires a core with a length of more than 200 mm. This causes various issues, such as an increase in cost, a decrease in productivity, an increase in space for installing components, and a decrease in product reliability.

In series resonance, the intensity of a resonant current is determined by the degree of resonance, that is, the correlation between the resonant frequency and Q value of a circuit, and a driving frequency. To control the magnetic field generated in space, it is necessary to provide a so-called current control circuit that detects a current flowing through a coil and adjusts an output voltage of the circuit. Thus, the circuit configuration may be complicated and the cost may be increased. An antenna system using series resonance involves the foregoing issues.

SUMMARY OF THE INVENTION

The present invention provides a magnetic-field generating circuit that generates a magnetic field and that is suitable for a communication apparatus used in, for example, a keyless entry system.

In particular, a magnetic-field generating circuit is provided according to a first aspect of the present invention that includes a transformer antenna that generates a magnetic field, and an AC power supply circuit that supplies an AC voltage serving as a driving voltage to a primary coil of the transformer antenna. The transformer antenna includes a transformer including the primary coil and a secondary coil and a resonant capacitor connected in parallel to the secondary coil of the transformer and. The secondary coil and the resonant capacitor form a parallel resonant circuit whose resonant frequency is set to be equal to a frequency of the AC voltage supplied from the AC power supply circuit.

A magnetic-field generating circuit according to a second aspect of the present invention includes a step-up transformer including a primary coil and a secondary coil, a parallel resonant coil antenna that generates a magnetic field, and an AC power supply circuit that supplies an AC voltage serving as a driving voltage to the step-up transformer. The parallel resonant coil antenna includes a third coil and a resonant capacitor connected in parallel to the third coil. The secondary coil and the parallel resonant coil antenna form a resonant circuit whose resonant frequency is set to be equal to a frequency of the AC voltage supplied from the AC power supply circuit.

A magnetic-field generating circuit according to a third aspect of the present invention includes a first coil, a parallel resonant coil antenna that generates a magnetic field, and an AC power supply circuit that supplies a rectangular-wave AC voltage serving as a driving voltage to the parallel resonant coil antenna. The parallel resonant coil antenna includes a second coil and a resonant capacitor connected in parallel to the second coil. The parallel resonant coil antenna has a resonant frequency that is set to be equal to a frequency of the AC voltage supplied from the AC power supply circuit.

According to the exemplary aspects of the present invention, a circuit is provided that is configured to generate a magnetic field by using a parallel resonant circuit, and accordingly the issues involved in a series resonant circuit can be solved.

BRIEF DESCRIPTION OF DRAWINGS

FIG. 3 is a diagram illustrating the comparison of actually measured values of various items between a magnetic-field generating circuit according to the related art and the magnetic-field generating circuit according to the first embodiment.

FIG. 4 is a diagram illustrating an example configuration of a magnetic-field generating circuit (a step-up transformer, a parallel resonant coil antenna, and a sine-wave AC power supply) according to a second embodiment of the present invention.

FIG. 5 is a diagram illustrating an example configuration of a magnetic-field generating circuit according to a third embodiment of the present invention.

FIGS. 6(A) and 6(B) include timing charts of switch elements in a driving circuit of the magnetic-field generating circuit according to the third embodiment.

FIG. 7 is a diagram illustrating a simulation result for the magnetic-field generating circuit according to the third embodiment.

FIGS. 8(A) and 8(B) are diagrams illustrating a simulation result (waveforms of various currents) for the magnetic-field generating circuit according to the third embodiment.

FIGS. 9(A) and 9(B) are diagrams illustrating a simulation result (drain currents of switch elements) for the magnetic-field generating circuit according to the third embodiment.

FIG. 10 is a diagram illustrating an actual measurement result for the magnetic-field generating circuit according to the third embodiment and the magnetic-field generating circuit according to the related art.

FIG. 11 is a diagram illustrating an actual measurement result for the magnetic-field generating circuit according to the third embodiment.

FIG. 12 is a diagram illustrating another example configuration of the magnetic-field generating circuit according to the third embodiment of the present invention.

FIG. 17 is a diagram illustrating a simulation result for the magnetic-field generating circuit according to the fourth embodiment.

FIG. 18 is a diagram illustrating an example configuration of a magnetic-field generating circuit (including a transformer antenna and a double forward circuit) according to a fifth embodiment of the present invention.

FIG. 26 is a diagram illustrating a gate signal waveform of switch elements of a driving circuit in a simulation in a magnetic-field generating circuit according to a twelfth embodiment of the present invention.

FIGS. 27(A) and 27(B) illustrate simulation results of a resonant current of a secondary coil of a transformer antenna in the magnetic-field generating circuit according to the twelfth embodiment.

FIGS. 33(A) and 33(B) are diagrams illustrating simulation results for a resonant current in the magnetic-field generating circuit according to the fourteenth embodiment.

FIGS. 42(A) and 42(B) is a diagram illustrating current transient characteristics of input current in the magnetic-field generating circuit according to the related art illustrated in FIG. 40.

FIG. 43 is a diagram illustrating the configuration of a basic parallel resonant circuit.

FIG. 44 is a diagram illustrating waveforms of various currents obtained when applying a sine-wave voltage in the parallel resonant circuit illustrated in FIG. 43.

FIGS. 45(A) and 45(B) is a diagram illustrating waveforms of various currents obtained when applying a rectangular-wave voltage in the parallel resonant circuit illustrated in FIG. 43.

DETAILED DESCRIPTION OF EMBODIMENTS

Figure 1:
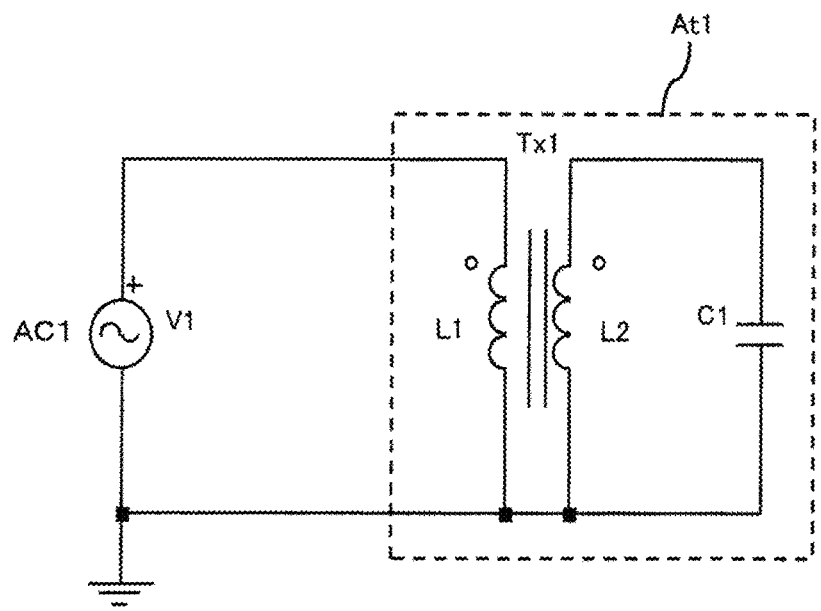
FIG. 1 is a diagram illustrating an example configuration of a magnetic-field generating circuit (a transformer antenna and a sine-wave AC power supply) according to a first embodiment of the present invention.

Hereinafter, exemplary embodiments of a magnetic-field generating circuit according to the present invention will be described in detail with reference to the attached drawings.

Hitherto, a coil antenna that includes a coil and a capacitor connected in series to each other and that uses series resonance has typically been used as an antenna for generating a spatial magnetic field. However, the coil antenna that uses series resonance involves, to obtain a high output, issues such as complexity in the circuit and necessity for higher output leading to increased cost, as described above.

Thus, parallel resonance may be used instead of series resonance. However, a magnetic-field apparatus using parallel resonance has hardly been put into practical use. The reasons will be described below.

FIG. 43 illustrates a basic parallel resonant circuit. In the parallel resonant circuit, a coil L1', which is formed by winding a coil around an open magnetic circuit core, and a capacitor C1' are connected in parallel to an alternating-current (AC) power supply AC. In parallel resonance, a resonant current I satisfying I=V/(2πfL) flows, where V represents an input voltage and fL represents a resonant frequency. For example, when there is a requirement for specifications in which the resonant current I is 1 ampere in a case where the inductance of the coil L1' is 165 μH and a driving frequency f is 125 kH, it is necessary to apply a sine-wave voltage of 130 V (peak-to-peak value) as a driving voltage to satisfy the requirement. However, it is very difficult to realize such a high-voltage driving system in an on-vehicle system.

A sine-wave voltage needs to be applied to cause parallel resonance. It is impossible to cause LC parallel resonance by applying a rectangular-wave voltage, which has a high-order component, using a bridge circuit or the like that is typically used. In addition, generation of a sine-wave voltage in the LF band involves difficulty and cost. For example, FIG. 44 and FIGS. 45(A)-(B) illustrate simulation waveforms in cases where a sine-wave voltage and a rectangular-wave voltage are applied to the parallel resonant circuit including the coil L1' with an inductance of 165 μH and the capacitor C1' with a capacitance of 10 μF. FIG. 44 illustrates the waveform of an input current flowing and the waveform of a coil current flowing through the coil L1', in a case where a sine-wave voltage of 125 kHz and 130 V (peak-to-peak value) is applied to the parallel resonant circuit. FIGS. 45(A)-(B) illustrate the waveforms of an input current and a coil current in a case where a rectangular-wave voltage of 125 kHz and 130 V (peak-to-peak value) is applied to the parallel resonant circuit. It is understood from FIG. 44 that a coil current is generated by resonance when a sine-wave voltage is applied. On the other hand, it is understood from FIGS. 45(A)-(B) that a peak current of 60 A is generated in an input current when a rectangular-wave voltage is applied, but the input current and the coil current have substantially the same values except for the peak current, and parallel resonance does not occur at the rectangular-wave voltage.

The above-described points may be the main reasons for which a parallel resonant circuit has not been applied to a magnetic-field generating circuit.

In the following exemplary embodiments, a description will be given of configurations of magnetic-field generating circuits (magnetic-field communication circuits) configured to generate a magnetic field by using parallel resonance, which has conventionally been difficult. Such a magnetic-field generating circuit is useful to, for example, a communication apparatus that generates a magnetic-field signal in the VLF band or LF band and that is applied to a keyless entry system of an automobile.

First Exemplary Embodiment

FIG. 1 is a diagram illustrating the configuration of a magnetic-field generating circuit according to a first embodiment of the present invention.

The magnetic-field generating circuit according to the first embodiment includes an AC power supply circuit AC1 that generates a sine-wave AC voltage, a transformer Tx1 including a primary coil L1 and a secondary coil L2, and a resonant capacitor C1 forming a resonant circuit together with the secondary coil L2 of the transformer Tx1.

Figure 2:
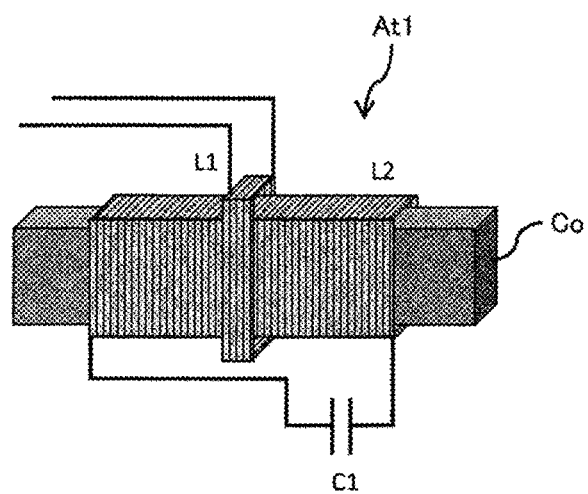
FIG. 2 is a diagram illustrating the configuration of the transformer antenna according to an embodiment of the present invention.

As illustrated in FIG. 2, the transformer Tx1 is formed by winding the primary coil L1 and the secondary coil L2 around the periphery of an open magnetic circuit core Co (e.g., a bar-like core). The resonant capacitor C1 is connected in parallel to the secondary coil L2 of the transformer Tx1. The secondary coil L2 of the transformer Tx1 and the resonant capacitor C1 form a parallel resonant circuit. The resonant frequency of the parallel resonant circuit is set to be equal to a driving frequency determined by the AC power supply circuit AC1. Thus, the inductance (L2) of the secondary coil L2 and the capacitance (C1) of the resonant capacitor C1 are set to values that make the resonant frequency equal to the deriving frequency. Furthermore, the turns ratio between the primary coil L1 and the secondary coil L2 is set such that a desired voltage output from the secondary coil L2 can be obtained from a voltage input to the primary coil L1. The transformer Tx1 and the resonant capacitor C1 are configured to function as a magnetic-field generating antenna having a transformer structure. Hereinafter, the antenna formed by the transformer Tx1 and the resonant capacitor C1 will be referred to as a "transformer antenna" At1. The resonant frequency of the parallel resonant circuit formed by the secondary coil L2 and the resonant capacitor C1 and the driving frequency which is the frequency of an AC voltage supplied from the AC power supply circuit AC1 need not necessarily be set to values strictly equal to each other, and may be set to, for example, values equal to each other within a range of ±10%.

The AC power supply circuit AC1 that supplies a sine-wave voltage is connected to the primary coil L1 of the transformer antenna At1. The AC power supply circuit AC1 applies a sine-wave voltage having a predetermined driving frequency to the primary coil L1 of the transformer antenna At1. Accordingly, the transformer antenna At1 causes a sine-wave current to be generated at the secondary coil L2 and causes an AC magnetic field to be generated. In this way, the AC power supply circuit AC1 functions as a driving circuit for the transformer antenna At1.

The inductance value of the secondary coil L2 of the transformer antenna At1 and the set value of the resonant current I are calculated on the basis of a required spatial magnetic flux density. Specifically, a necessary voltage value V is calculated on the basis of the relationship expressed by the resonant current I=V/(2πfL), and a turns ratio and/or the inductance value of the primary coil L1 are calculated from an input voltage, the degree of primary-to-secondary coupling, and the inductance of the secondary coil L2. In a case where a high spatial magnetic flux intensity is required, a large inductance of the secondary coil L2 and a large resonant current I are necessary. Thus, the number of turns of the primary coil L1 needs to be minimum (one to a few), and the positions of the primary coil L1 and the secondary coil L2 are very important.

In the magnetic-field generating circuit according to this embodiment having the above-described configuration, use of parallel resonance enables the rise time of a coil current to be shortened and variation in resonant current value caused by a frequency to be reduced. In addition, a damping resistor, which is necessary in a series resonant circuit, is not necessary. Thus, loss resulting from a damping resistor does not occur and the efficiency of the circuit is improved. Furthermore, there are no restrictions, such as a damping resistor and a current rise time, and thus the upper limit of a coil current is limited only by power or loss.

Setting of the turns ratio and inductance value of the transformer Tx1 to appropriate values makes it possible to optimize the output voltage and resonant current of the secondary coil L2. For example, operation at the most appropriate coil-capacitor voltage can be performed while taking the voltage resistance of the resonant capacitor and coils into account.

In addition, a magnetic-field output can be increased by increasing a coil current without increasing the length of the open magnetic circuit core Co. Also, the length of the open magnetic circuit core Co can be reduced, that is, size reduction can be achieved, while securing an output equivalent to that in the related art.

In addition, even if a difference occurs between the parallel resonant frequency and the driving frequency, the resonant current of the secondary coil generating a magnetic field hardly changes.

Figure 40:
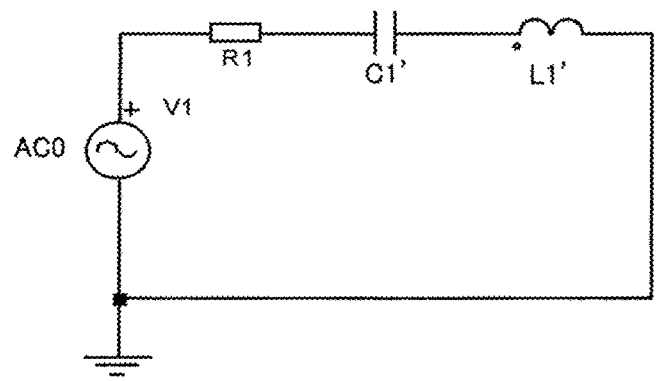
FIG. 40 is a diagram illustrating the configuration of a magnetic-field generating circuit using series resonance according to the related art.
Figure 41:
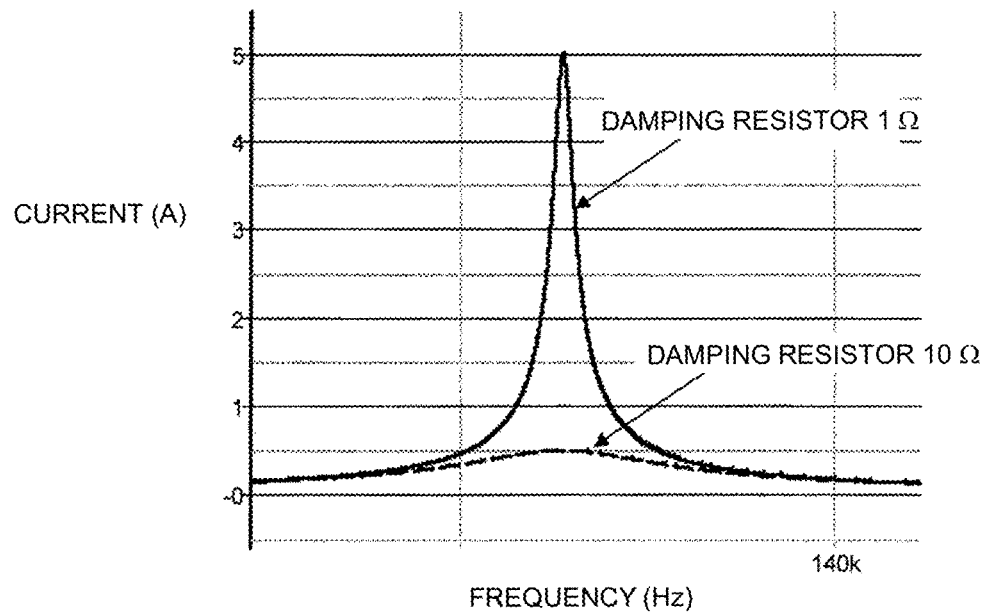
FIG. 41 is a diagram illustrating frequency characteristics of input current in the magnetic-field generating circuit according to the related art illustrated in FIG. 40.

FIG. 3 illustrates the comparison of actually measured values of various items between the magnetic-field generating circuit according to the related art (FIG. 40) and the magnetic-field generating circuit according to this embodiment (FIG. 1). In the magnetic-field generating circuit according to the related art, in the circuit configuration illustrated in FIG. 40, $R1=10\Omega$, $C1'=10$ nF, $L1'=166$ µH, and the core has a length of 90 mm in a coil antenna. In the first embodiment, in the circuit configuration illustrated in FIG. 1, $C1=10$ nF, $L2=166$ µH, the turns ratio $N2/N1$ of the secondary coil/primary coil is 35, and the open magnetic circuit core Co has a length of 90 mm. The measured data indicates values at the resonant frequencies of the respective antennas.

Referring to FIG. 3, in this embodiment, the input current is 21% of that of the related art, and the spatial magnetic flux density is 172% of that of the related art. That is, a significant improvement is seen both in the efficiency and output. In parallel resonance, which has basic characteristics that a coil resonant current is constant and that only an input current decreases in accordance with the degree of LC parallel resonance, the spatial magnetic flux density can be easily kept constant regardless of the degree of resonance although variation in input current occurs.

As described above, the magnetic-field generating circuit according to this embodiment uses parallel resonance. Advantages of using parallel resonance include constant output, higher speed, and higher efficiency and higher power resulting from not using a damping resistor. In parallel resonance, which has basic characteristics that a coil resonant current is constant and that only an input current decreases in accordance with the degree of parallel resonance, the spatial magnetic flux density can be easily kept constant regardless of the degree of resonance, and a damping resistor is not necessary unlike in a series resonant circuit.

Furthermore, parallel resonance has basic characteristics that the rising speed of a resonant current is essentially very high, and thus the rise time of a coil resonant current (=spatial magnetic flux density) can be shortened without using a damping resistor. The rise time does not significantly change even if the inductance value of the coil increases. The unnecessity for a damping resistor eliminates the loss resulting from a damping resistor that occupies much of loss in the related art, and thus the circuit efficiency is significantly enhanced.

In addition, because there is no current limitation by a damping resistor, a resonant current can be increased. An increase in inductance does not have a great influence on the rise time. Thus, an increase in inductance value or an increase in circuit resonant current, which is impossible in the related art, enables an increase in power of a magnetic-field output.

As described above, in the magnetic-field generating circuit according to this embodiment, use of parallel resonance enables the rise time of a coil current to be shortened and variation in resonant current value caused by frequencies to be decreased. Thus, a damping resistor is not necessary, the loss resulting from the damping resistor can be reduced, and the circuit efficiency is improved. Furthermore, setting of the turns ratio and inductance value of the transformer to appropriate values makes it possible for the output voltage and resonant current of the secondary coil to have preferable values. For example, operation at a preferable coil-capacitor voltage can be performed while taking the voltage resistance of the resonant capacitor and coils into account. Furthermore, a magnetic-field output can be increased by increasing a coil current without increasing the length of the open magnetic circuit core Co. Also, size reduction can be achieved while maintaining an output equivalent to that in the related art.

Second Exemplary Embodiment

Another configuration of the magnetic-field generating circuit according to the present invention will be described. FIG. 4 is a diagram illustrating the configuration of a magnetic-field generating circuit according to a second embodiment of the present invention. According to the exemplary embodiment, the magnetic-field generating circuit is formed by the AC power supply circuit AC1 that supplies a sine-wave voltage, a step-up transformer Tx2, and a parallel resonant coil antenna At2. The parallel resonant coil antenna At2 includes a coil L3 and the resonant capacitor C1 connected in parallel to the coil L3. The coil L3 has a function equivalent to the function of a leakage inductance component in the transformer Tx1 of the transformer antenna At1. In the step-up transformer Tx2, the secondary coil L2 is connected in parallel to the parallel resonant coil antenna At2, and the primary coil L1 is connected to the AC power supply circuit AC1, which is a driving circuit. The parallel resonant frequency of a circuit formed of the secondary coil L2 of the step-up transformer Tx2 and the parallel resonant coil antenna At2 is set to be equal to a driving frequency, which is the frequency of an AC voltage supplied from the AC power supply circuit AC1. The parallel resonant frequency of the circuit formed of the secondary coil L2 of the step-up transformer Tx2 and the parallel resonant coil antenna At2 and the driving frequency of the AC voltage supplied from the AC power supply circuit AC1 need not necessarily be set to values strictly equal to each other, and may be set to, for example, values equal to each other within a range of ±10%.

An AC voltage V1 supplied from the AC power supply circuit AC1 is applied to the primary coil L1 of the step-up transformer Tx2. The step-up transformer Tx2 converts the input voltage in accordance with the turns ratio between the primary coil L1 and the secondary coil L2, supplies the voltage to the parallel resonant coil antenna At2, and accordingly causes an AC magnetic field to be generated from the parallel resonant coil antenna At2.

The magnetic-field generating circuit according to this embodiment having the above-described configuration has the following effects in addition to effects similar to those in the first embodiment. Because boosting is performed by the dedicated transformer Tx2, an existing coil antenna can be used. In addition, a coil input voltage can be adjusted with a turns ratio (step-up ratio) by using a closed magnetic circuit transformer with good coupling, and thus a coil current can be easily adjusted. In the first embodiment, the voltage to be applied to the LC parallel resonant circuit is increased by using the transformer function of the transformer antenna. In contrast, in this embodiment, the voltage is increased by using a dedicated step-up transformer, thereby implementing a similar function. The other operations and functions are similar to those in the first embodiment, and thus the description thereof is omitted here.

Third Exemplary Embodiment

In the first embodiment, a sine-wave AC voltage is applied as a voltage for driving the transformer antenna At1. In contrast, in this embodiment, a description will be given of a configuration of a magnetic-field generating circuit that applies a rectangular-wave AC voltage as a voltage for driving the transformer antenna At1.

FIG. 5 is a diagram illustrating the configuration of a magnetic-field generating circuit according to a third embodiment of the present invention. The magnetic-field generating circuit according to this embodiment includes the transformer antenna At1, a direct-current (DC) power supply DC1, and a half-bridge circuit 10 serving as a driving circuit for driving the transformer antenna At1. The DC power supply DC1 and the half-bridge circuit 10 (driving circuit) form an AC power supply circuit that outputs a rectangular-wave AC voltage. The half-bridge circuit 10 includes an input capacitor C3, two switch elements Q1 and Q2 connected in series to each other, and a gate driving circuit GD that controls the switch elements Q1 and Q2. In an exemplary aspect, the switch elements Q1 and Q2 are each formed by a FET, for example.

The transformer antenna At1 is similar to that described in the first embodiment. The primary coil L1 of the transformer antenna At1 and an output terminal of the half-bridge circuit 10 are connected to each other. More specifically, a high-voltage-side terminal of the primary coil L1 of the transformer antenna At1 is connected to a node between the switch elements Q1 and Q2 with a bypass capacitor C2 interposed therebetween.

The half-bridge circuit 10 receives a DC voltage from the DC power supply DC1 through the input capacitor C3, converts the received DC voltage into a desired rectangular-wave voltage, and supplies the rectangular-wave voltage to the transformer antenna At1. Specifically, the half-bridge circuit 10 drives the two switch elements Q1 and Q2 in opposite phases (exclusively) at a predetermined on-duty ratio and a predetermined frequency, thereby generating a rectangular-wave voltage with a predetermined driving frequency from the DC power supply DC1 and applying the rectangular-wave voltage to the primary coil L1 of the transformer antenna At1. As a result, a sine-wave resonant current is generated at the secondary coil L2, and an AC magnetic field is generated in space.

In particular, to enable a resonant operation using a rectangular-wave voltage, an appropriate OFF period is provided in the switching operation of each of the switch elements Q1 and Q2 of the half-bridge circuit 10. Specifically, the on-duty ratio of the switch element is set to a value within a range of 10% to 45%. Preferably, the on-duty ratio of the switch element may be set to a value within a range of 10% to 40%. More specifically, the on-duty ratio may be set to a value within a range of 10% to 20%. FIGS. 6(A) and 6(B) are timing charts of the switch elements Q1 and Q2 on the high voltage side and the low voltage side, respectively. For example, as illustrated, the off-duty ratio is set to 75%, that is, the on-duty ratio is set to 25%. The inventor has found that setting of duty ratios within such a range enables a parallel resonant operation using a rectangular-wave voltage. Also, the inventor has found that appropriate setting and utilization of the leakage inductance between the primary coil L1 and the secondary coil L2 of the transformer antenna At1 enables the peak value of the current output from the half-bridge circuit 10 to be significantly attenuated. As a result, highly efficient generation of a sine-wave resonant current has become possible.

In the configuration according to this embodiment, the on-duty ratio of each switch element of the half-bridge circuit is set to an appropriate value, that is, to 10% to 45% herein. For example, in a case where the on-duty ratio is set to 25%, the switch element Q1 on the high voltage side is short-circuited (turned ON) at 25% and the switch element Q2 on the low voltage side is short-circuited (turned ON) at 25%, and thus the primary coil L1 is electrically floating from the input power supply and the GND during a residual period of 50%. This is a free vibration period in the parallel resonant circuit in the secondary coil of the transformer antenna via transformer coupling, and the free vibration period enables parallel resonance in a secondary parallel resonant circuit. Furthermore, utilization of the leakage inductance generated between the primary coil and the secondary coil of the transformer antenna makes it possible to limit a maximum peak current flowing from the driving circuit into the transformer antenna.

The transformer antenna enables a high voltage to be applied to a secondary resonant system, and a combination of these four factors (a high voltage obtained by the transformer antenna, a circuit capable of realizing a free vibration period, setting of the free vibration period, and an appropriate leakage inductance) has made it possible to produce, for the first time, a practical spatial magnetic-field generating circuit using parallel resonance.

FIG. 7 illustrates a simulation result for the configuration of the magnetic-field generating circuit according to this embodiment. The simulation was performed on a sample (i.e., sample #1) of the transformer antenna At1 in which L2=166 μH, C1=10 μF, turns ratio N2/N1=35, and the core length=90 mm. With this configuration, a simulation was performed in which a rectangular-wave voltage was applied at an on-duty ratio of 25%. FIGS. 8(A) and 8(B) illustrate the simulation result for an input current from the DC power supply to the half-bridge circuit 10 (circuit input current Iin), an input current to the transformer Tx1 (hereinafter referred to as a "transformer input current Itr"), and a resonant current flowing through the secondary coil L2 (hereinafter referred to as a "coil resonant current Icoil"). FIGS. 9(A) and 9(B) illustrate the simulation result of the waveforms of drain currents and gate signals of the switch element Q1 on the high voltage side and the switch element Q2 on the low voltage side.

Referring to FIGS. 8(A) and 8(B), it is understood that the coil resonant current Icoil of the secondary coil L2 is a sine wave and that the transformer input current Itr has a waveform different from a sine wave. The transformer input current Itr is a current that is supplied from the half-bridge circuit 10 to compensate for the loss resulting from a resistor and the attenuation of a secondary resonant current caused by a difference between an LC resonant frequency and a driving frequency. The value of this current is determined by the difference between a voltage supplied from the switch elements Q1 and Q2 and a voltage excited by the secondary resonant current, and becomes smaller as the LC parallel resonant frequency approaches the driving frequency.

It is also understood from FIGS. 8(A) and 8(B) that the circuit input current Iin (mA order) is extremely small relative to the transformer input current Itr (A order). Most of the drain current of the switch element Q1 on the high voltage side is supplied from the input capacitor C3 (see FIG. 5), and a negative portion of the drain current is a current that is brought back to the input capacitor C3. The drain current of the switch element Q2 on the low voltage side is supplied from the coil resonant current Icoil of the secondary coil, and there is no energy supply from the half-bridge circuit. Consequently, the current used in this circuit is only the current obtained by subtracting a negative current from a positive current of the drain current of the switch element Q1 on the high voltage side. As a result, the coil resonant current Icoil of the secondary coil is calculated to be 0.636 Arms with respect to the circuit input current Iin=0.014 Arms.

The result of simulation has been described above. Next, an actual measurement result will be described. Measurements were performed on the coil antenna according to the related and the transformer antenna according to this embodiment. Regarding this embodiment, a sample #3 (L2=337 μH, turns ratio=70, C1=4.7 μF) of the transformer antenna At1 with higher output was prepared by further increasing the secondary inductance value and the turns ratio, in addition to a sample (sample #2) having the same condition as that of the sample #1 used in the simulation. FIG. 10 illustrates the actual measurement result for the samples #2 and #3 according to the related art and this embodiment.

Compared to the method according to the related art, the circuit input current is decreased to 23% in the sample #2 and to 42% in the sample #3. On the other hand, it has been confirmed that the spatial magnetic flux density is significantly increased to 177% in the sample #2 and to 286% in the sample #3. It has also been confirmed that, in the configuration according to this embodiment, the rise time of the magnetic flux density is equivalent to that in the related art.

Regarding the comparison in the circuit input current and the coil resonant current, the circuit input current Iin is 0.147 A (effective value) and the coil resonant current Icoil is 0.357 A (effective value) in the related art. That is, the coil resonant current Icoil is about 2.4 times the circuit input current Iin in the related art. In contrast, in the sample #2 of this embodiment, the circuit input current Iin is 0.034 A (effective value) and the coil resonant current Icoil is 0.665 A (effective value). That is, the coil resonant current Icoil is about 20 times the circuit input current Iin. On the other hand, in the sample #3, the circuit input current Iin is 0.062 A (effective value) and the coil resonant current Icoil is 0.679 A (effective value). That is, the coil resonant current Icoil is about 10.7 times the circuit input current Iin. Accordingly, it has been confirmed that operation can be performed with higher efficiency in this embodiment than in the related art.

With the configuration according to this embodiment, characteristics of parallel resonance make it possible to reduce fluctuation in coil resonant current with respect to fluctuation in driving frequency. In addition, power regeneration from an input current is performed for the input capacitor C3, and thus fluctuation in input current with respect to fluctuation in driving frequency is relatively small.

FIG. 11 illustrates actually measured values of frequency characteristics in the sample #2 in a case where the driving frequency is changed. It can be confirmed that, in a case where the driving frequency is changed, the output magnetic flux density hardly varies and the frequency characteristic of the output magnetic flux is extremely stable. Regarding the circuit input current, the maximum value is 3.5 times the minimum value. It has been confirmed that fluctuation is suppressed in a resonant system from which a resistance component such as a damping resistor is eliminated as much as possible.

Figure 13:
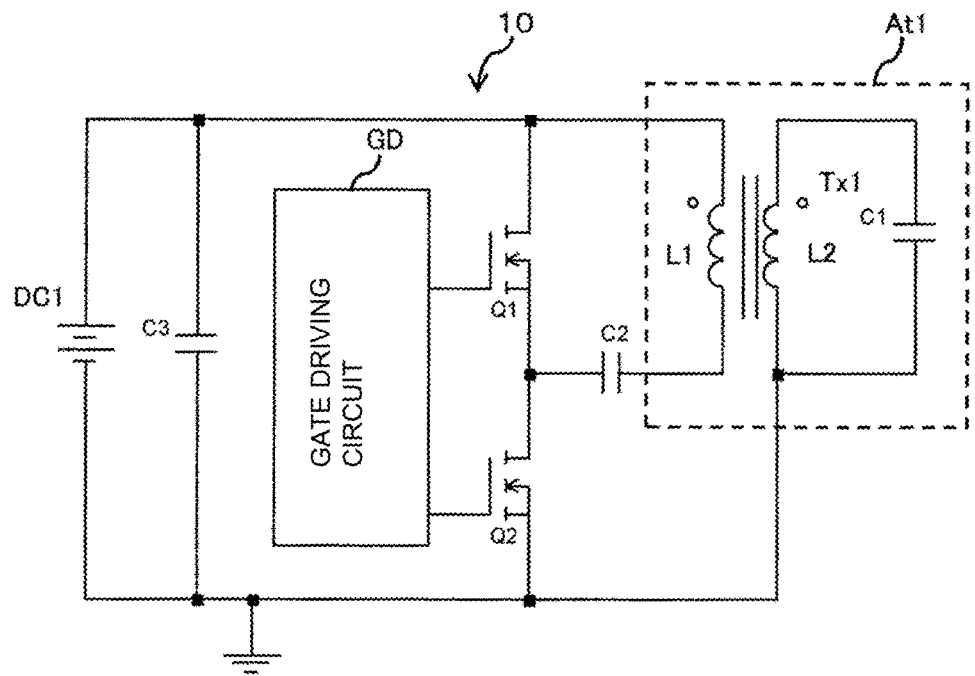
FIG. 13 is a diagram illustrating another example configuration of the magnetic-field generating circuit according to the third embodiment of the present invention.
Figure 14:
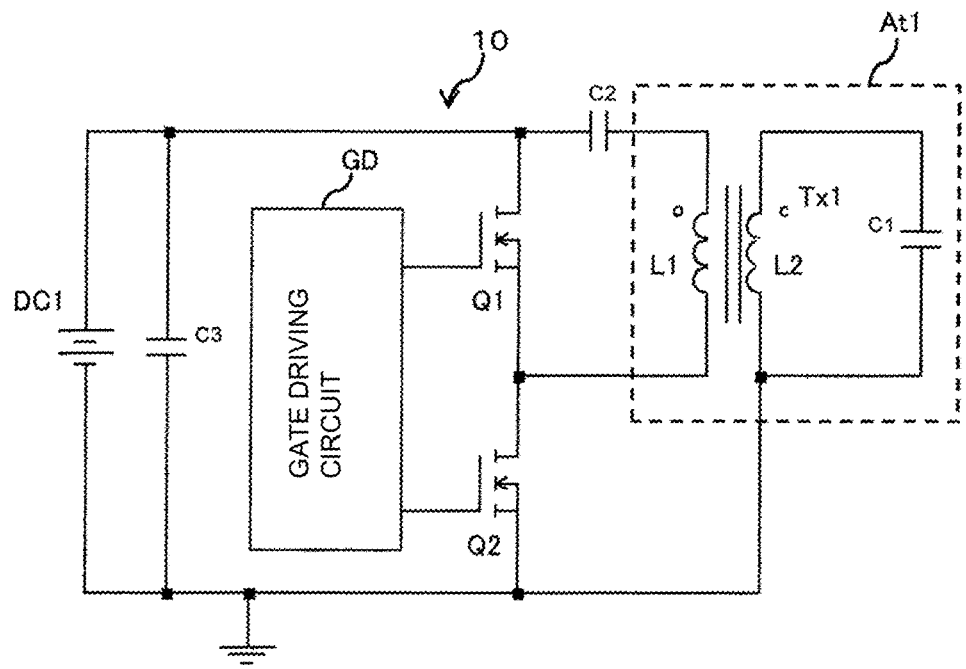
FIG. 14 is a diagram illustrating another example configuration of the magnetic-field generating circuit according to the third embodiment of the present invention.

The method for connecting a half-bridge circuit to the transformer antenna At1 is not limited to that illustrated in FIG. 5, and various connection methods are available. For example, FIG. 12 to FIG. 14 illustrate other examples of connection of the half-bridge circuit to the transformer antenna At1. In FIG. 12, the bypass capacitor C2 is disposed between the low-voltage-side end of the primary coil L1 and the low-voltage-side output end of the half-bridge circuit. In FIG. 13, the transformer antenna At1 is connected in parallel to the switch element Q1 on the high voltage side, and the bypass capacitor C2 is disposed between the low-voltage-side end of the primary coil L1 and the low-voltage-side end of the switch element Q1. In FIG. 14, the transformer antenna At1 is connected in parallel to the switch element Q1 on the high voltage side, and the bypass capacitor C2 is disposed between the high-voltage-side end of the primary coil L1 and the high-voltage-side end of the switch element Q1.

The magnetic-field generating circuit having the above-described configuration has the following effects in addition to the effects described in the first embodiment. That is, driving of a parallel resonant circuit by a half-bridge circuit with a simple structure and easy control, which has been difficult in the related art, can be performed. Thus, the convenience can be increased and the cost can be decreased in the system. In addition, a regenerated current from the transformer side and a self-excited resonance operation in an operation period of the low-voltage-side switch element make it possible to significantly reduce the current actually supplied to the driving circuit and improve efficiency. Also, variation in input current resulting from variation in frequency can be reduced. As a result, it is possible to obtain a highly efficient circuit with a small difference caused by variation in frequency of an input current.

Fourth Exemplary Embodiment

Figure 15:
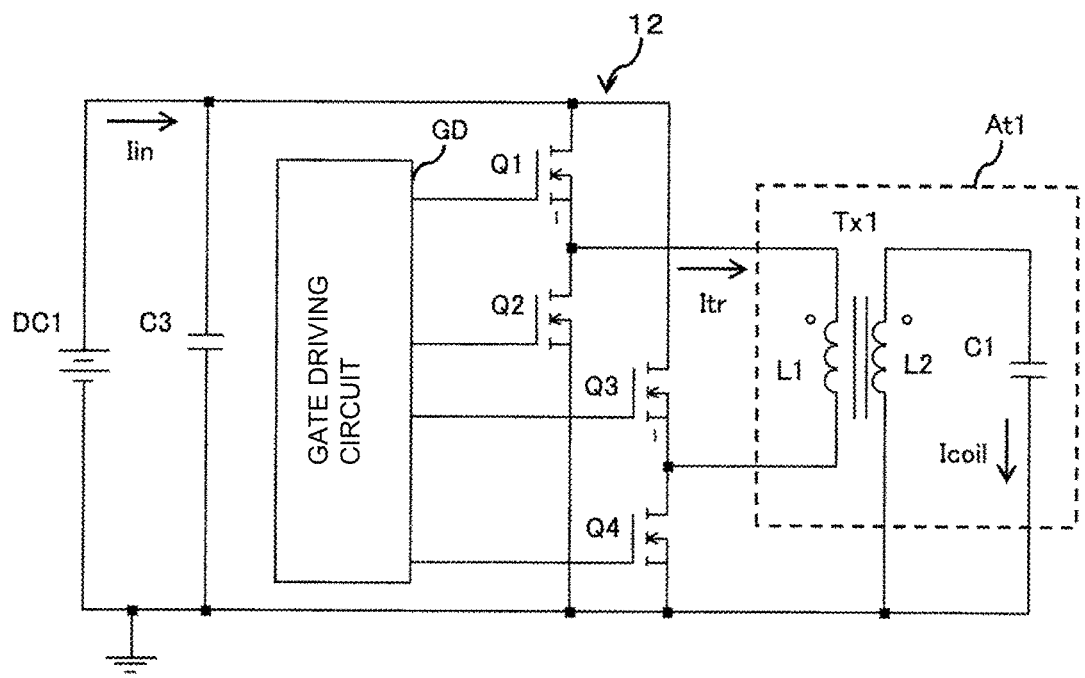
FIG. 15 is a diagram illustrating an example configuration of a magnetic-field generating circuit (including a transformer antenna and a full-bridge circuit) according to a fourth embodiment of the present invention.

In the third embodiment, a half-bridge circuit is used as a driving circuit for driving the transformer antenna At1. The driving circuit is not limited to a half-bridge circuit, and another type of driving circuit may be used. For example, the half-bridge circuit 10 may be changed to a full-bridge circuit in each configuration illustrated in the third embodiment. FIG. 15 illustrates a configuration in which a full-bridge circuit is applied as a driving circuit for the transformer antenna At1.

As illustrated in FIG. 15, a full-bridge circuit 12 includes the input capacitor C3, four switch elements Q1 to Q4, and the gate driving circuit GD that controls the switch elements Q1 to Q4. The switch elements Q1 and Q2 are connected in series to each other, and the switch elements Q3 and Q4 are connected in series to each other. The series circuit formed of the switch elements Q1 and Q2 and the series circuit formed of the switch elements Q3 and Q4 are connected in parallel to each other. The transformer antenna At1 is similar to that described in the first embodiment. A node between the switch element Q1 and the switch element Q2 is connected to the high-voltage-side end of the primary coil L1 of the transformer antenna At1, and a node between the switch element Q3 and the switch element Q4 is connected to the low-voltage-side end of the primary coil L1 of the transformer antenna At1.

The full-bridge circuit 12 receives a DC voltage from the DC power supply DC1 through the input capacitor C3 and performs ON/OFF driving of the switch elements Q1 to Q4, thereby generating a rectangular-wave AC voltage with a desired driving frequency from the received DC voltage. The generated rectangular-wave AC voltage is applied to the primary coil L1 of the transformer antenna At1. Accordingly, a sine-wave resonant current is generated in the secondary coil L2 and an AC magnetic field is generated in space. As in the case of the half-bridge circuit 10, the full-bridge circuit 12 is driven by setting the on-duty ratio of the switch elements Q1, Q2, Q3, and Q4 to an appropriate value, 10% to 45% herein.

In this case, an AC voltage whose amplitude is twice the amplitude of the voltage supplied from the DC power supply DC1 (that is, a circuit input voltage) is applied to the primary coil L1 of the transformer antenna At1. Because the transformer antenna At1 has a function of a "transformer", the output voltage doubles when the input voltage doubles. Thus, this configuration makes it possible to easily increase a coil current, that is, a spatial magnetic flux density. When the specifications of the transformer antenna At1 are changed to perform adjustment so as not to change the output voltage, the current of each of the switch elements Q1 to Q4 becomes about ½. Thus, the current value necessary for the switch elements Q1 to Q4 decreases, and it becomes possible to use switch elements with lower performance (lower cost).

Figure 16A:
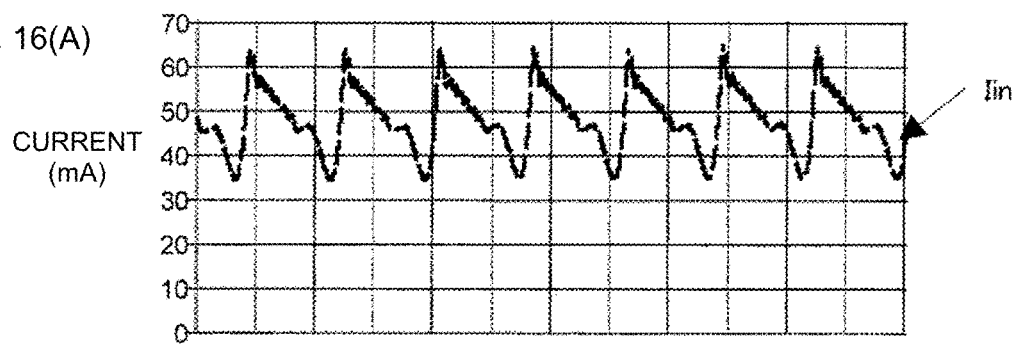
FIGS. 16(A) and 16(B) are diagrams illustrating a simulation result (waveforms of various currents) for the magnetic-field generating circuit according to the fourth embodiment.
Figure 16B:
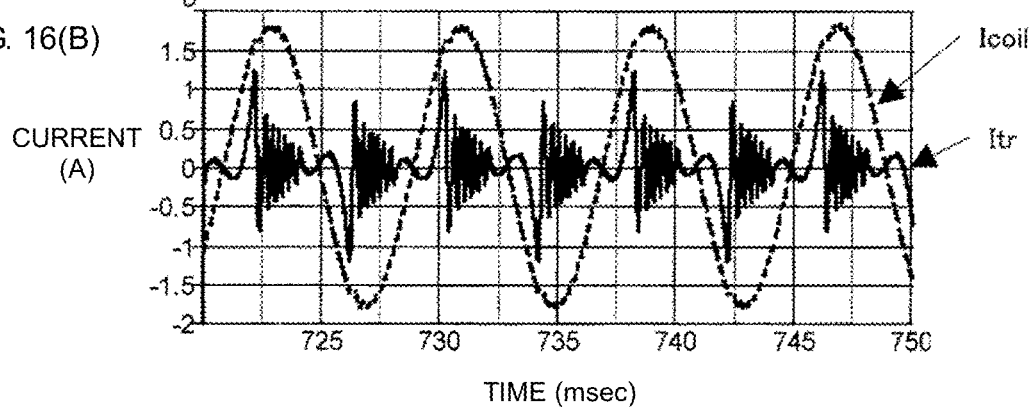

FIGS. 16(A) and 16(B) illustrate simulation results of the waveforms of the circuit input current Iin from the DC power supply DC1 to the gate driving circuit GD, the transformer input current Itr, and the coil resonant current Icoil of the secondary coil L2.

A simulation of applying a rectangular-wave voltage with an on-duty ratio of 25% was performed in the circuit configuration illustrated in FIG. 15. FIG. 17 illustrates the simulation result. FIG. 17 illustrates, in addition to the simulation result in the circuit configuration according to the fourth embodiment, the simulation result in the configuration according to the third embodiment for comparison. The specifications of the transformer antenna At1 used here are as follows. The inductance value (L2) of the secondary coil L2=166 µH, the capacitance (C1) of the capacitor C1=10 nF, the turns ratio N2/N1 of the transformer Tx1=35, and the length of the core is 90 mm. The only difference is a driving circuit (a half-bridge circuit or a full-bridge circuit). In the fourth embodiment, the input current to the full-bridge circuit 12 is about 340% of that in the third embodiment. On the other hand, the input current to the transformer antenna At1 is 140%. This indicates that the current peak value of each of the switch elements Q1 to Q4 is decreased by the full-bridge circuit 12. The spatial magnetic flux density ratio is significantly increased to 198%. From the above, it has been confirmed that the combination of the transformer antenna At1 and the full-bridge circuit 12 is highly effective to decrease the current values of the switch elements Q1 to Q4 and to increase the spatial magnetic flux density.

The configuration according to this embodiment has the following effects in addition to the effects of the configurations according to the first and third embodiments. With use of the full-bridge circuit 12, the voltage applied to the primary coil L1 is substantially doubled with respect to the voltage of the DC power supply DC1. This makes it possible to further increase the coil output current. On the other hand, when the coil output current is equivalent, it is possible to reduce the maximum drain current for each switch element to ½ and to use switch elements or an IC with lower performance. Accordingly, the switch elements or the like can be easily selected.

Fifth Exemplary Embodiment

In each configuration illustrated in the third embodiment, a double forward circuit may be used as a driving circuit for the transformer antenna At1, instead of the half-bridge circuit 10.

FIG. 18 illustrates a configuration in which a double forward circuit is applied as a driving circuit for the transformer antenna At1. A double forward circuit 14 includes the input capacitor C3, a series circuit formed of the switch element Q1 and a diode D1, a series circuit formed of a diode D2 and the switch element Q2, and the gate driving circuit GD that controls the switch elements Q1 and Q2. The series circuit formed of the switch element Q1 and the diode D1 and the series circuit formed of the diode D2 and the switch element Q2 are connected in parallel to each other. The transformer antenna At1 is similar to that described in the first embodiment. A node between the switch element Q1 and the diode D1 is connected to the high-voltage-side end of the primary coil L1 of the transformer antenna At1. A node between the diode D2 and the switch element Q2 is connected to the low-voltage-side end of the primary coil L1 of the transformer antenna At1.

When driving the transformer antenna At1, the double forward circuit 14 performs an operation substantially similar to the driving by the half-bridge circuit 10 according to the third embodiment. That is, also for the double forward circuit 14, the on-duty ratio of each of the switch elements Q1 and Q2 is set to an appropriate value (here, 10% to 45%) for driving. Also with the configuration according to this embodiment, effects similar to those of the configuration according to the third embodiment can be obtained.

Sixth Exemplary Embodiment

In each configuration illustrated in the third embodiment, a push-pull circuit may be used as a driving circuit for the transformer antenna At1, instead of the half-bridge circuit 10.

Figure 19:
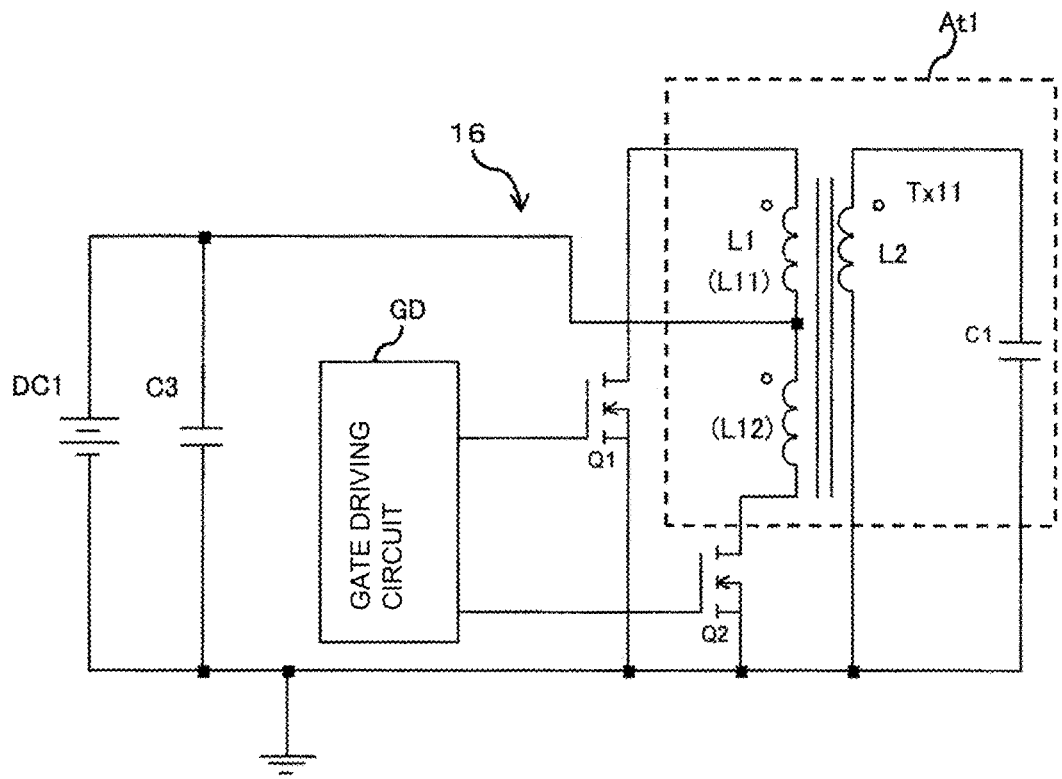
FIG. 19 is a diagram illustrating an example configuration of a magnetic-field generating circuit (including a transformer antenna and a push-pull circuit) according to a sixth embodiment of the present invention.

FIG. 19 illustrates a configuration in which a push-pull circuit 16 is applied as a driving circuit for the transformer antenna At1. In FIG. 19, the push-pull circuit 16 includes the input capacitor C3, the switch elements Q1 and Q2, and the gate driving circuit GD that controls the switch elements Q1 and Q2. In a transformer Tx11 of the transformer antenna At1, the primary coil L1 includes a first coil portion L11 and a second coil portion L12. The switch element Q2 is connected in series to the second coil portion L12 on the low voltage side of the second coil portion L12. The switch element Q1 is connected in parallel to a series circuit formed of the primary coil L1 and the switch element Q2. The high-voltage-side output end of the DC power supply DC1 is connected to a node between the first coil portion L11 and the second coil portion L12. The low-voltage-side ends of the switch elements Q1 and Q2 are connected to the low-voltage-side output end of the DC power supply DC1.

Also for the push-pull circuit 16, as in the case of the half-bridge circuit 10, the on-duty ratio of each of the switch elements Q1 and Q2 is set to an appropriate value (here, 10% to 45%) for driving. With use of the push-pull circuit 16, like the full-bridge circuit according to the fourth embodiment, the voltage applied to the transformer antenna At1 can be made substantially twice the circuit input voltage. Thus, it becomes possible to increase a coil output current, that is, to decrease an input current. In addition, it becomes possible to implement a circuit operation for executing an equivalent function by using half the number of switch elements of the full-bridge circuit (two switch elements). The operation of the apparatus including the push-pull circuit 16 is substantially similar to that in the fourth embodiment.

Seventh Exemplary Embodiment

In the second embodiment, the parallel resonant coil antenna At2 is driven by a sine-wave AC voltage. The parallel resonant coil antenna At2 can also be driven by a rectangular-wave AC voltage, as disclosed in the third to sixth embodiments. That is, in the configurations illustrated in the third to sixth embodiments, the transformer antenna At1 may be replaced with the parallel resonant coil antenna At2 and the step-up transformer Tx2 illustrated in the second embodiment. Also with this configuration, it is noted that effects similar to those in the third to sixth embodiments can be obtained.

Figure 20:
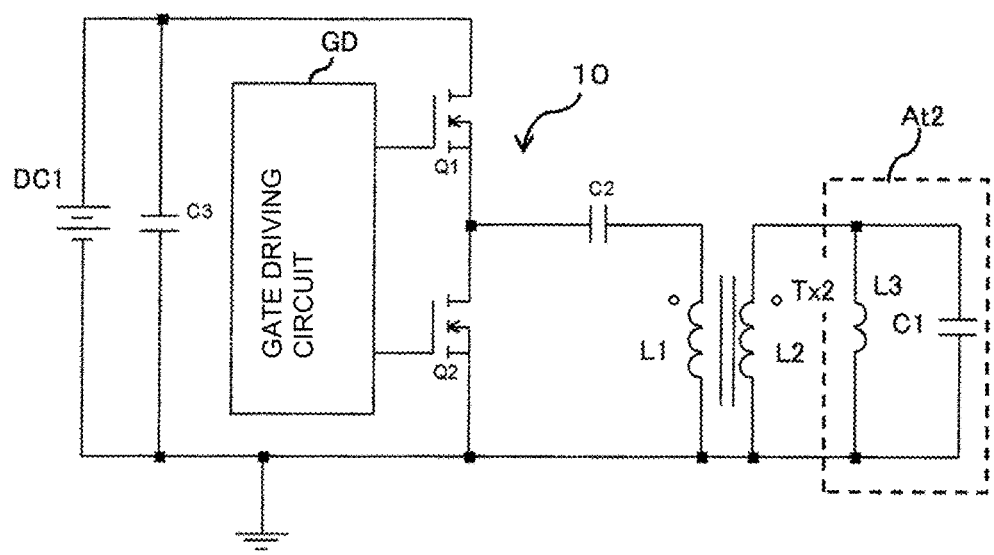
FIG. 20 is a diagram illustrating an example configuration of a magnetic-field generating circuit (including a parallel resonant coil antenna and a half-bridge circuit) according to a seventh embodiment of the present invention.

FIG. 20 is a diagram illustrating a configuration in which, in the configuration illustrated in FIG. 5 of the third embodiment, the transformer antenna At1 is replaced with the parallel resonant coil antenna At2 and the step-up transformer Tx2. That is, FIG. 20 illustrates a configuration in which the parallel resonant coil antenna At2 is driven by the half-bridge circuit 10. The half-bridge circuit 10 is operated similarly to the third embodiment. That is, the two switch elements Q1 and Q2 are driven in opposite phases at an on-duty ratio within a range of 10% to 45%. Accordingly, effects similar to those in the third embodiment can be obtained.

The leakage inductance between the primary coil L1 and the secondary coil L2 of the step-up transformer Tx2 in this embodiment has a function equivalent to that of the leakage inductance between the primary coil L1 and the secondary coil L2 of the transformer antenna At1 described in the third embodiment.

The configuration according to this embodiment can be applied only by changing the connection between the coil and the capacitor in a coil antenna according to the related art from a series connection to a parallel connection. In addition, a closed magnetic circuit transformer with good coupling enables a coil input voltage to be adjusted by using a turns ratio (step-up ratio), and thus a coil resonant current can be easily adjusted.

In the third to sixth embodiments, a high voltage is applied to the LC parallel resonant circuit by using the transformer antenna At1. In contrast, in this embodiment, use of the step-up transformer Tx2 enables a high voltage to be supplied to the LC parallel resonant circuit, and a necessary resonant current can be obtained. The driving circuit of the magnetic-field generating circuit according to this embodiment is operated similarly to the second and third to sixth embodiments to generate an AC magnetic field in space as described above.

Eighth Exemplary Embodiment

The parallel resonant coil antenna At2 disclosed in the second embodiment and a coil having a predetermined inductance value may be connected to any one of the various driving circuits described in the third to sixth embodiments (that is, the driving circuits illustrated in FIGS. 5, 12 to 15, 18, and 19).

Figure 21:
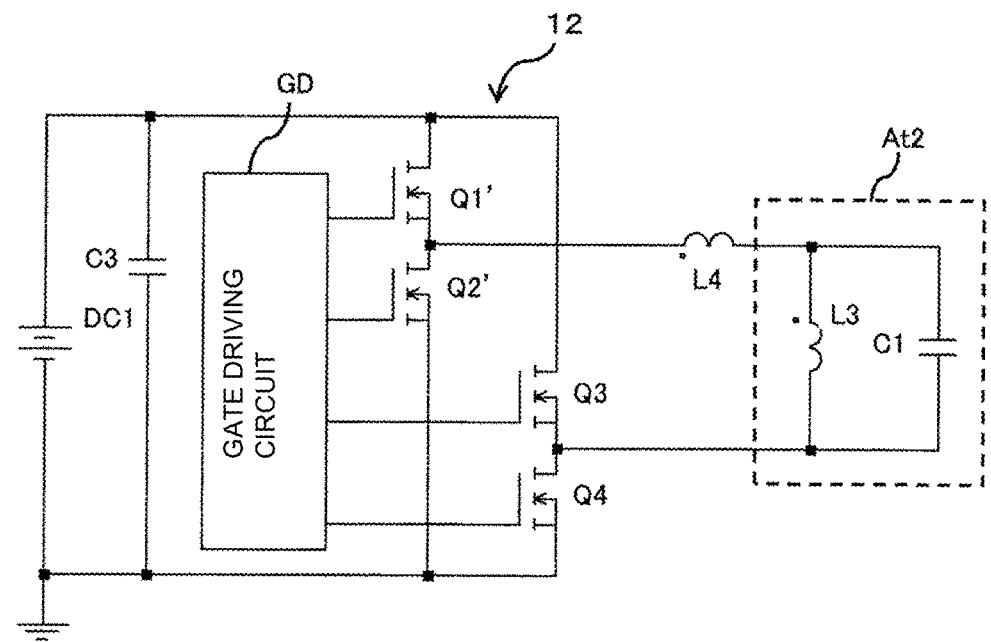
FIG. 21 is a diagram illustrating an example configuration of a magnetic-field generating circuit (including a parallel resonant coil antenna and a full-bridge circuit) according to an eighth embodiment of the present invention.

FIG. 21 illustrates, as an example, a configuration in which the parallel resonant coil antenna At2 and a coil L4 having a predetermined inductance value are connected to the full-bridge circuit 12, which is an example of a driving circuit. The parallel resonant frequency of the parallel resonant coil antenna At2 is set to be equal to the driving frequency. The full-bridge circuit 12 is operated similarly to the third to sixth embodiments to supply a rectangular-wave AC voltage to the parallel resonant coil antenna At2 and the coil L4, and accordingly an AC magnetic field can be generated from the parallel resonant coil antenna At2 into space. The parallel resonant frequency of the parallel resonant coil antenna At2 and the driving frequency need not necessarily be set to values strictly equal to each other, and may be set to values equal to each other within a range of ±10%, for example.

The inductance of the coil L4 according to this embodiment has a function equivalent to the leakage inductance between the primary coil L1 and the secondary coil L2 of the transformer antenna At1 described in the third embodiment.

In the above-described embodiments, a high voltage and limitation of an input current peak are realized by the transformer antenna At1 or the step-up transformer Tx2. On the other hand, in a case where the input voltage to the driving circuit is sufficient for the LC parallel resonant circuit, the above-described method for obtaining a high voltage is not necessary. Thus, by disposing the primary coil L1 for limiting the input current peak between the parallel resonant coil antenna At2 and the driving circuit 10, 12, or the like, an operation similar to that in the third to sixth embodiments can be performed, and similar effects can be obtained. The configuration according to this embodiment can be applied only by changing the connection between the coil and the capacitor in the coil antenna according to the related art from a series connection to a parallel connection.

Ninth Exemplary Embodiment

Figure 22:
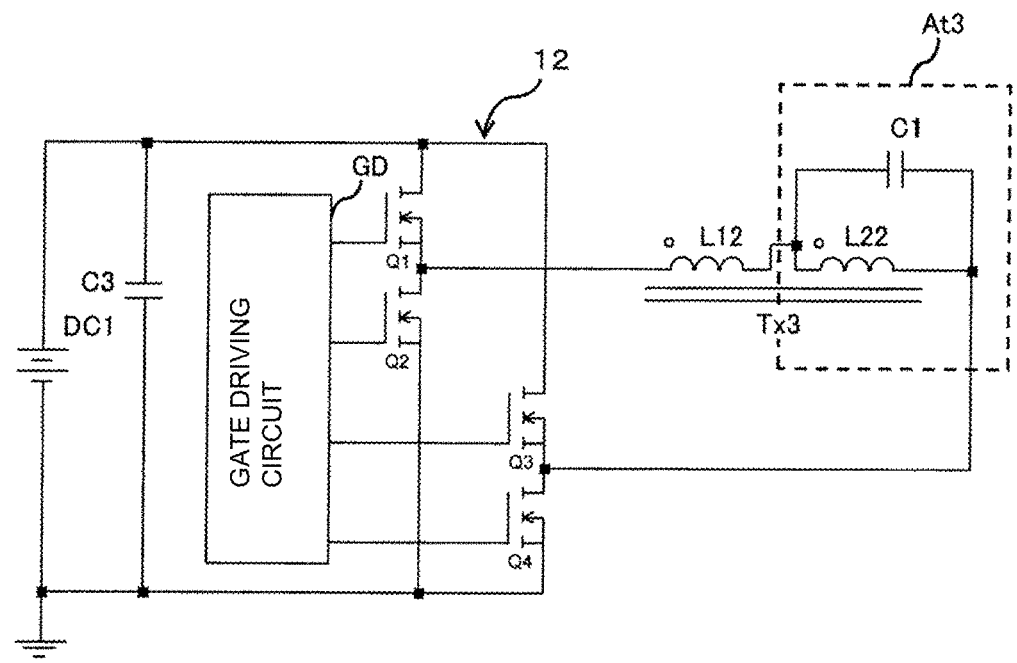
FIG. 22 is a diagram illustrating an example configuration of a magnetic-field generating circuit (another configuration of the parallel resonant coil antenna) according to a ninth embodiment of the present invention.

FIG. 22 is a diagram illustrating another configuration of the magnetic-field generating circuit. The magnetic-field generating circuit according to this embodiment includes a parallel resonant coil antenna At3 including a first coil L12 and a second coil L22 connected in series to each other and the resonant capacitor C1 connected in parallel to the second coil L22. The first coil L12 and the second coil L22 are formed by winding wires around the periphery of an identical open magnetic circuit core. Any one of the various types of driving circuits 10 to 16 illustrated in the third to sixth embodiments is connected to the parallel resonant coil antenna At3. FIG. 22 discloses an example in which the full-bridge circuit 12 is connected as a driving circuit to the parallel resonant coil antenna At3.

The parallel resonant frequency of the parallel resonant coil antenna At3 is set to be equal to the driving frequency. Also in this embodiment, the driving circuit operates similarly to the third to sixth embodiments and causes an AC magnetic field to be generated from the parallel resonant coil antenna At3 into space. For example, in a case where a half-bridge circuit is connected as a driving circuit to the parallel resonant coil antenna At3, the two switch elements Q1 and Q2 are driven in opposite phases at an on-duty ratio within a range of 10% to 45%. The parallel resonant frequency of the parallel resonant coil antenna At3 and the driving frequency need not necessarily be set to values strictly equal to each other, and may be set to values equal to each other within a range of ±10%, for example.

The first coil L12 of the parallel resonant coil antenna At3 according to this embodiment has a function equivalent to that of the leakage inductance between the primary coil L1 and the secondary coil L2 of the transformer antenna At1 described in the third embodiment.

Also with the configuration according to this embodiment, effects similar to those in the third to sixth embodiments can be obtained. In the configuration according to this embodiment, when the coil L22 for limiting a peak current is built in the parallel resonant coil antenna, the cost and installation space can be more effectively reduced than in the configuration according to the eighth embodiment.

Tenth Exemplary Embodiment

Figure 23:
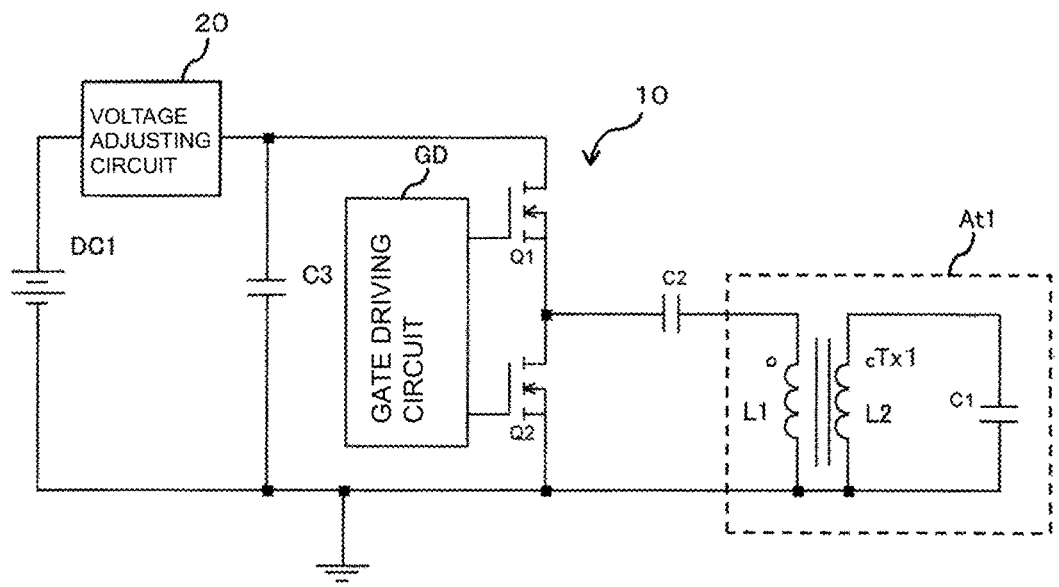
FIG. 23 is a diagram illustrating an example configuration of a magnetic-field generating circuit (including a voltage adjusting circuit) according to a tenth embodiment of the present invention.
Figure 24:
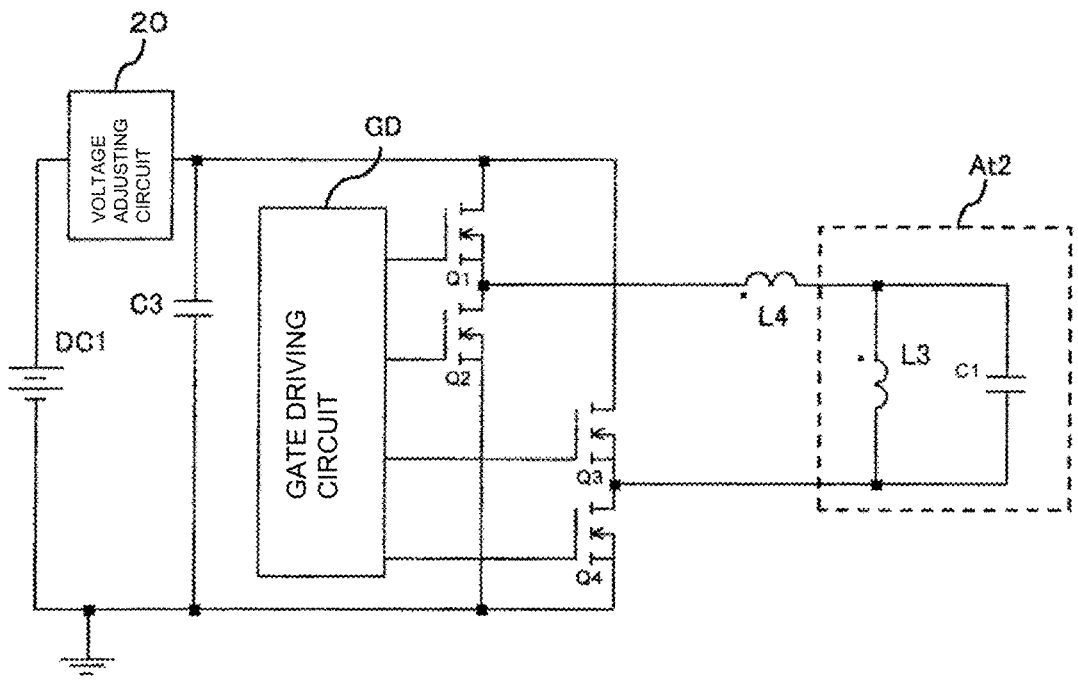
FIG. 24 is a diagram illustrating another example configuration of the magnetic-field generating circuit according to the tenth embodiment of the present invention.

In the magnetic-field generating circuits according to the third to ninth embodiments, a voltage adjusting circuit that adjusts the output voltage of the DC power supply DC1 may be disposed between the DC power supply DC1 and a node between the input capacitor C3 and the switch element Q1. FIG. 23 illustrates, as an example, a configuration in which a voltage adjusting circuit 20 is disposed in the configuration of the magnetic-field generating circuit according to the third embodiment (FIG. 5). FIG. 24 illustrates, as an example, a configuration in which the voltage adjusting circuit 20 is disposed in the configuration of the magnetic-field generating circuit according to the eighth embodiment (FIG. 21). The output voltage is adjusted by the voltage adjusting circuit 20, and thereby the current flowing through the transformer antenna At1 or the parallel resonant coil antenna At2 is adjusted, which makes is possible to adjust the intensity of the AC magnetic field to be generated in space.

In the case of supplying a sine-wave driving voltage as in the first and second embodiments, a coil resonant current is substantially proportional to a voltage input to the antenna regardless of the degree of the difference between the driving frequency and the resonant frequency because of the characteristics of parallel resonance. Furthermore, also in the driving method using a bridge circuit or the like as in the third to ninth embodiments, a coil resonant current is substantially proportional to a voltage input to the bridge circuit or the like regardless of the degree of the difference between the driving frequency and the parallel resonant frequency of the parallel resonant circuit (see FIG. 10). Thus, as a result of adjusting the voltage input to the bridge circuit or the like by the voltage adjusting circuit 20 as in this embodiment, a parallel resonant current, that is, a spatial magnetic field intensity, can be adjusted.

Furthermore, the output voltage of the voltage adjusting circuit 20 and the spatial magnetic field intensity are substantially proportional to each other. Thus, the correlation between the output voltage of the voltage adjusting circuit 20 and the spatial magnetic field intensity may be grasped in advance and the output voltage of the voltage adjusting circuit 20 may be set to a desired value. This makes it possible to freely adjust the spatial magnetic field intensity without detecting a coil current or a spatial magnetic field or performing feedback control. That is, a desired spatial magnetic field intensity can be generated without detecting a coil current or a spatial magnetic field or performing feedback, which is effective to simplify the system and reduce the cost.

Eleventh Exemplary Embodiment

In this embodiment, a description will be given of a configuration further including a resistor for measuring a resonant current (hereinafter referred to as a "current monitoring resistor") in the configuration including the voltage adjusting circuit 20 according to the tenth embodiment. Specifically, in the configuration according to the tenth embodiment, a current monitoring resistor is connected in series to the secondary coil L2 of the transformer antenna At1 or the coil of the parallel resonant coil antenna At2 in order to measure the resonant current (coil current) of the transformer antenna At1 or the parallel resonant coil antenna At2.

Figure 25A:
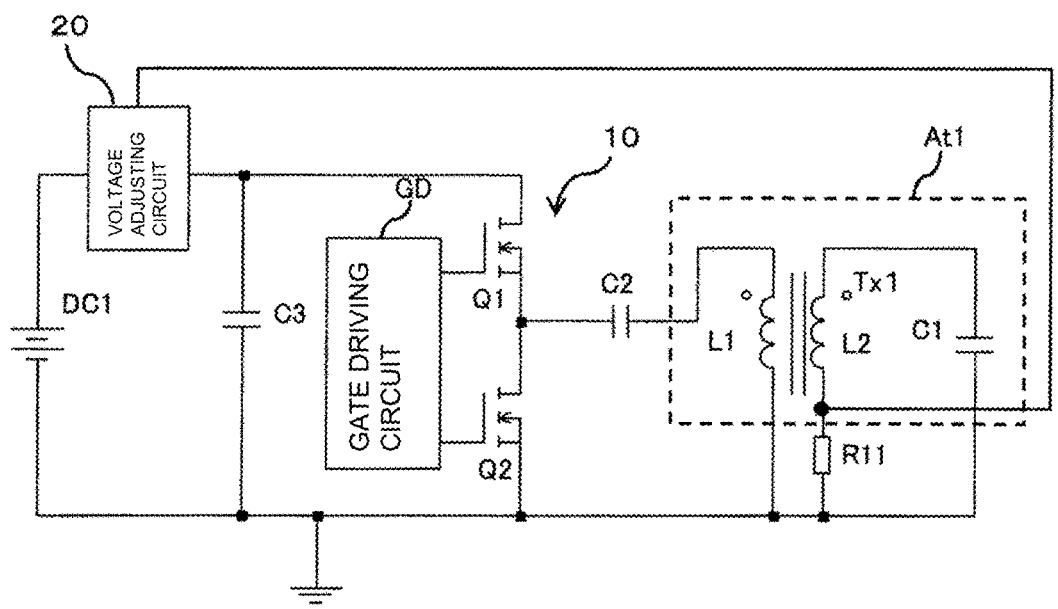
FIGS. 25(A) and 25(B) include diagrams illustrating example configurations of a magnetic-field generating circuit (including a current monitoring resistor) according to an eleventh embodiment of the present invention.

For example, as illustrated in FIG. 25(A) a current monitoring resistor R11 may be connected to the secondary coil L2 of the transformer antenna At1 in the configuration illustrated in FIG. 23. The voltage across the current monitoring resistor R11 is monitored to measure a coil current and feedback the measured value to the voltage adjusting circuit 20. The voltage adjusting circuit 20 controls the voltage input to the driving circuit (in the example in FIG. 25 (A), the half-bridge circuit 10) on the basis of the resonant current flowing through the secondary coil L2 of the transformer antenna At1. This enables highly accurate control of a coil current.

Figure 25B:
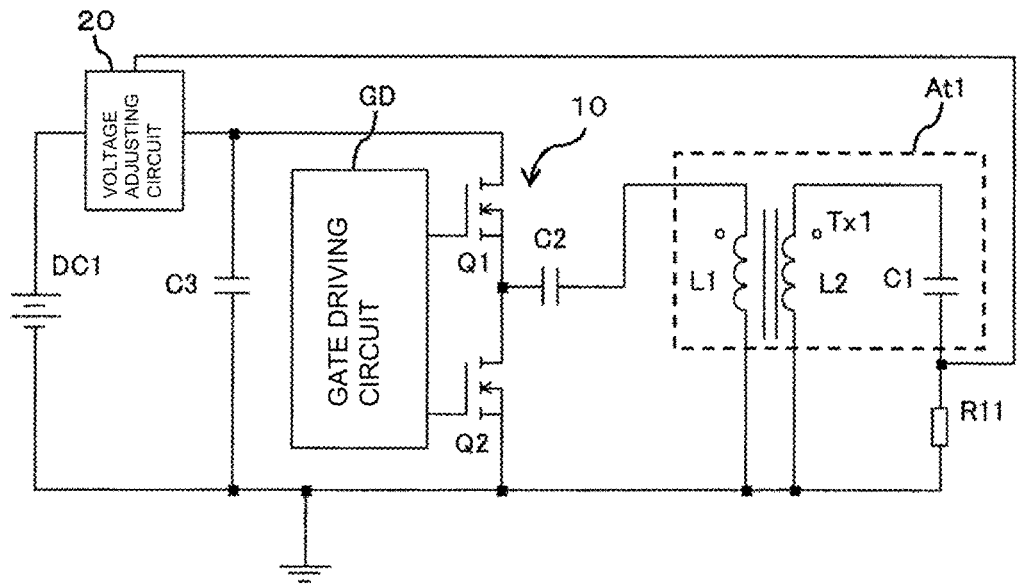

As illustrated in FIG. 25(B), the current monitoring resistor R11 may be connected in series to the resonant capacitor C1 of the transformer antenna At1 in order to measure the transformer antenna At1 in the configuration illustrated in FIG. 23. Also in this case, it is possible to obtain effects equivalent to those in the case of connecting the current monitoring resistor R11 in series to the secondary coil L2 of the transformer antenna At1 (i.e., FIG. 25(A)).

Alternatively, to measure the resonant current of the parallel resonant coil antenna At2 in the configuration illustrated in FIG. 24, the current monitoring resistor R11 may be connected in series to the coil L3 of the parallel resonant coil antenna At2. Also in this case, similar effects can be obtained.

The current monitoring resistor R11 may be disposed in the transformer antenna At1 or the parallel resonant coil antenna At2, or may be disposed outside these antennas At1 and At2.

In parallel resonance, the value of an input current is different from the value of a resonant current (coil current). The resonant current can be measured by measuring the voltage across the current monitoring resistor R11 connected in series to the secondary coil L2 of the transformer antenna At1, the parallel resonant coil antenna At2, or the resonant capacitor C1. As the current monitoring resistor R11, for example, a resistor having a resistance value that inhibits the occurrence of loss for the resonant current and that allows a generated voltage to have a value suitable for measurement is used.

Twelfth Exemplary Embodiment

In the configuration using a half-bridge circuit, a full-bridge circuit, or a double forward circuit as a driving circuit in the configurations according to the third to eleventh embodiments, control may be performed to short circuit a switch element in the driving circuit after a magnetic-field generation operation has been completed.

For example, in the case of using a half-bridge circuit as a driving circuit, the switch element Q2 is short-circuited by the gate driving circuit GD after a magnetic-field generation operation has finished in the configurations illustrated in FIG. 5 and FIG. 12. In the configurations illustrated in FIG. 13 and FIG. 14, the switch element Q1 is short-circuited by the gate driving circuit GD after a magnetic-field generation operation has finished. In the configuration using a full-bridge circuit as illustrated in FIG. 15, the switch elements Q2 and Q4 are short-circuited by the gate driving circuit GD after a magnetic-field generation operation has finished. In the configuration using a double forward circuit as illustrated in FIG. 18, the switch element Q2 is short-circuited by the gate driving circuit GD after a magnetic-field generation operation has finished. Such a short-circuit operation makes it possible to forcibly release the resonant current remaining in the transformer antenna At1 or the parallel resonant coil antenna At2 and significantly shorten the rise time.

A parallel resonant circuit has an issue that the fall time of a resonant current is long. In particular, in a state where the operation of the driving circuit is stopped in the third to eleventh embodiments, that is, in a state where all the switch elements are electrically opened, the primary coil end of the transformer antenna At1 or the step-up transformer Tx2 is opened, and a coil resonant current is attenuated only by the loss of the resistor in the resonant system. In this state, a time constant of 100 μs or less, which is required for a typical LF communication system, is not satisfied.

Thus, as a result of electrically short-circuiting the primary coil L1 as described above, short-circuit release of the resonant current of the secondary coil L2 of the transformer antenna At1 or the resonant current of the parallel resonant coil antenna At2 can be performed on the primary side through the transformer antenna At1 or the step-up transformer Tx2. Accordingly, the resonant current is quickly attenuated, and the fall time of the magnetic field intensity is shortened.

A simulation was performed by applying short-circuit control of the switch elements according this embodiment in the configuration according to the fourth embodiment including the transformer antenna At1 and the full-bridge circuit 12 illustrated in FIG. 15. The simulation result will be described below. FIG. 26 illustrates the gate signal waveform of the switch elements Q2 and Q4 in the simulation. After a magnetic-field generation operation has stopped (after turning OFF the gate signal to the switch elements Q1 and Q2), an ON signal is input to only the gate of the switch element Q2 and the gate of the switch element Q4, thereby electrically short-circuiting the switch elements Q2 and Q4. In this example operation, a normal ON operation of the switch elements Q2 and Q4 is performed during a period from 0.1 ms to 0.6 ms, and a discharge operation of the switch elements Q2 and Q4 (only Q2 and Q4 are ON) is performed during a period from 0.6 ms to 0.9 ms. During a period from when 0.9 ms elapses to when the next operation is started, the switch elements Q2 and Q4 may be kept in an ON state. That is, the switch elements Q2 and Q4 may be in an ON state during a period from 0.6 ms to 0.9 ms, and after that the switch elements Q2 and Q4 may be turned ON or OFF.

FIGS. 27(A) and 27(B) illustrate simulation results of the resonant current of the secondary coil L2 of the transformer antenna At1. FIG. 27(A) illustrates a case where a short-circuit operation of a switch element is not performed, whereas FIG. 27(B) illustrates a case where a short-circuit operation of a switch element is performed. As illustrated in FIG. 27(A), in a case where a short-circuit operation is not performed, resonance of a coil current is continued even after 0.6 ms, which is a magnetic field generation operation end time. In contrast, as illustrated in 27(B), in a case where a short-circuit operation is performed, the resonant current quickly attenuates after the magnetic-field generation operation ends.

Thirteenth Exemplary Embodiment

In this embodiment, a description will be given of another configuration different from that of the twelfth embodiment, for quickly decreasing a resonant current.

In this embodiment, a switch that can be electrically or mechanically short-circuited is disposed in a circuit portion where the output of the driving circuit in the third, fourth, fifth, seventh, eighth, ninth, tenth, or eleventh embodiment is connected to the primary side of the transformer antenna At1 or the step-up transformer Tx2. FIG. 28 to FIG. 31 illustrate example configurations in which the spirit of this embodiment is applied to a magnetic-field generating circuit including the transformer antenna At1. A switch can be formed by, for example, a FET or relay.

Figure 28:
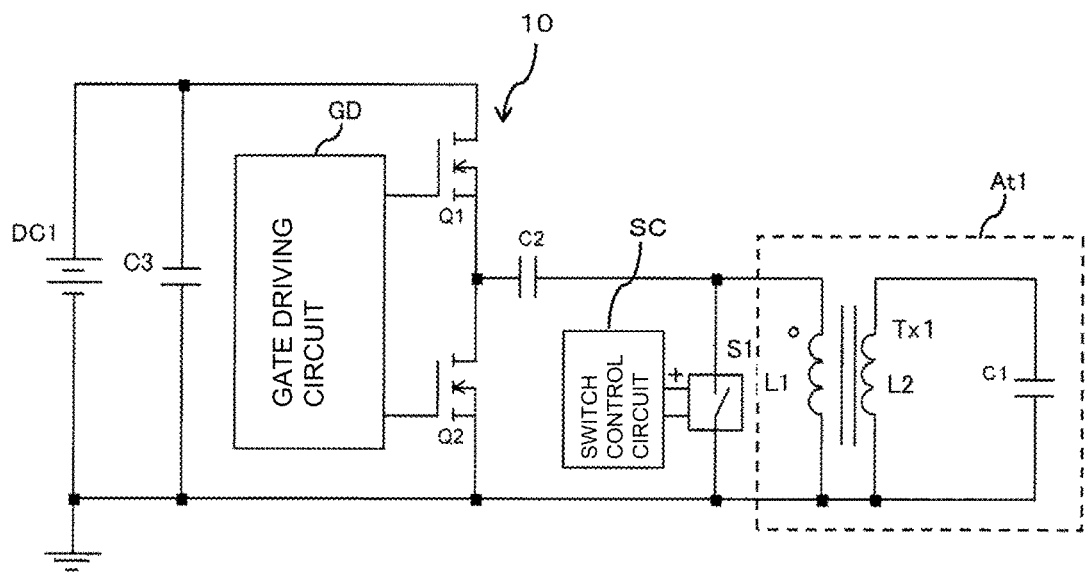
FIG. 28 is a diagram illustrating an example configuration of a magnetic-field generating circuit (including a short-circuit switch) according to a thirteenth embodiment of the present invention.

In the configuration illustrated in FIG. 28, a switch S1 is connected in parallel to the primary coil L1 of the transformer antenna At1 in the configuration illustrated in FIG. 5 including a half-bridge circuit as a driving circuit. Furthermore, a switch control circuit SC that controls ON/OFF of the switch S1 is provided in the configuration illustrated in FIG. 28. The switch control circuit SC turns ON the switch S1 after the magnetic-field generating circuit has finished a magnetic-field generation operation. Accordingly, the primary coil L1 is short-circuited, and the resonant current flowing through the primary coil L1 can be forcibly released.

Figure 29:
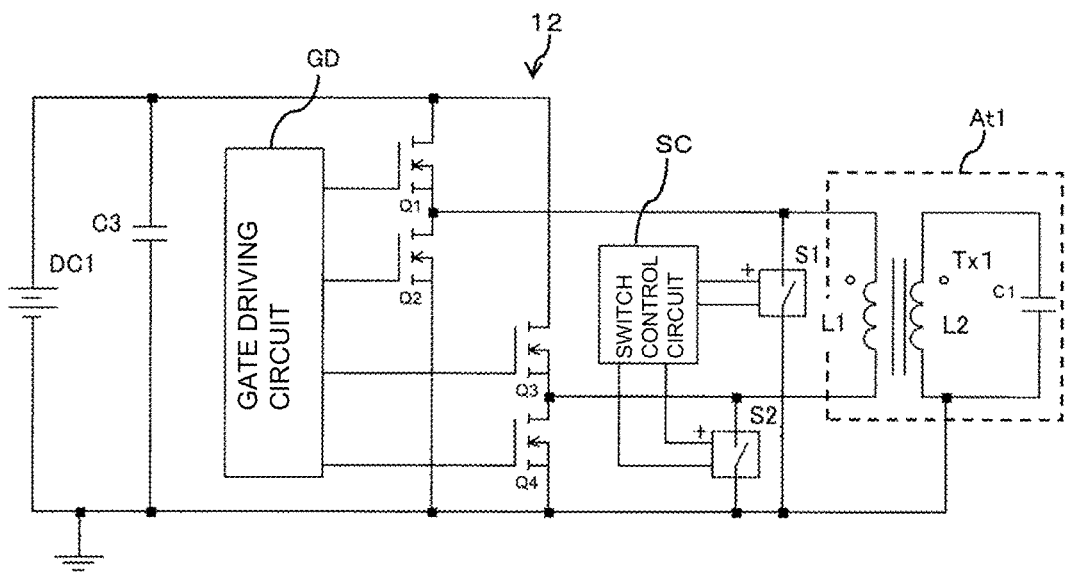
FIG. 29 is a diagram illustrating another example configuration of the magnetic-field generating circuit according to the thirteenth embodiment.

In the configuration illustrated in FIG. 29, the switch S1 is connected between the high-voltage-side end of the primary coil L1 of the transformer antenna At1 and the ground potential (the low-voltage-side output end of the DC power supply DC1) in the configuration illustrated in FIG. 15 including a full-bridge circuit as a driving circuit. In addition, a switch S2 is connected between the low-voltage-side end of the primary coil L1 of the transformer antenna At1 and the ground potential. Furthermore, the switch control circuit SC that controls ON/OFF of the switches S1 and S2 is provided. The switch control circuit SC turns ON the switches S1 and S2 after the magnetic-field generating circuit has finished a magnetic-field generation operation. Accordingly, the primary coil L1 is short-circuited, and the resonant current flowing through the primary coil L1 can be forcibly released.

Figure 30:
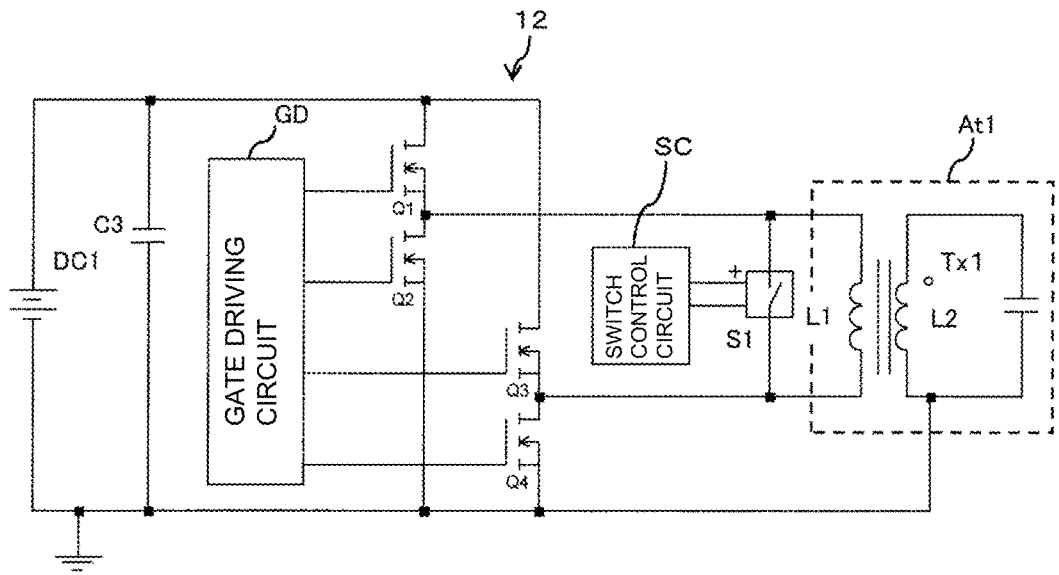
FIG. 30 is a diagram illustrating another example configuration of the magnetic-field generating circuit according to the thirteenth embodiment.

In the configuration illustrated in FIG. 30, the switch S1 is connected in parallel to the primary coil L1 of the transformer antenna At1 in the configuration illustrated in FIG. 15 including a full-bridge circuit as a driving circuit. Furthermore, the switch control circuit SC that controls ON/OFF of the switch S1 is provided. The switch control circuit SC turns ON the switch S1 after the magnetic-field generating circuit has finished a magnetic-field generation operation. Accordingly, the primary coil L1 is short-circuited, and the resonant current flowing through the primary coil L1 can be forcibly released.

Figure 31:
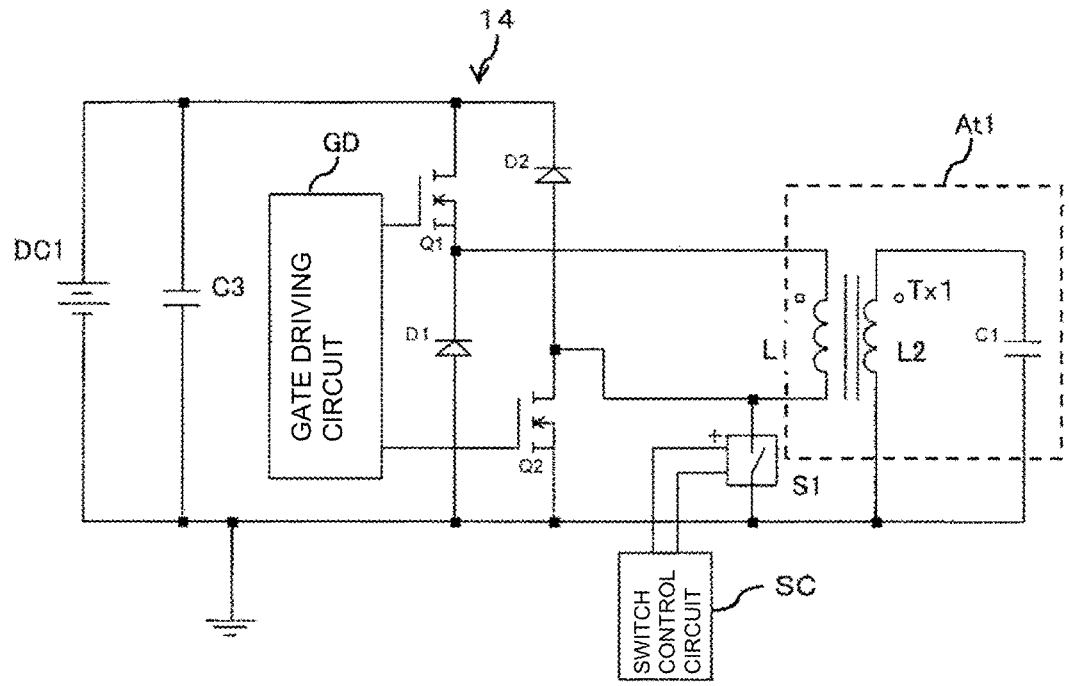
FIG. 31 is a diagram illustrating another example configuration of the magnetic-field generating circuit according to the thirteenth embodiment.

In the configuration illustrated in FIG. 31, the switch S1 is connected between the low-voltage-side end of the primary coil L1 of the transformer antenna At1 and the ground potential (the low-voltage-side output end of the DC power supply DC1) in the configuration illustrated in FIG. 18 including a double forward circuit as a driving circuit. Furthermore, the switch control circuit SC that controls ON/OFF of the switch S1 is provided. The switch control circuit SC turns ON the switch S1 after the magnetic-field generating circuit has finished a magnetic-field generation operation. Accordingly, the low-voltage-side end of the primary coil L1 is connected to the ground, a current path of the diode D1, the primary coil L1, and the switch S1 is formed, and the resonant current can be forcibly released in the path.

In the above-described configurations, the switches S1 and S2 are short-circuited after a magnetic-field generation operation has finished, and thereby the resonant current remaining in the transformer antenna At1 (or the parallel resonant coil antenna At2) can be forcibly released and the fall time of the resonant current can be significantly shortened.

Fourteenth Exemplary Embodiment

In a case where a half-bridge circuit is included as a driving circuit and the short-circuit control of the switch elements illustrated in the twelfth embodiment is performed, a diode may be connected in parallel to the bypass capacitor C2 in the half-bridge circuit in order to attenuate the resonant current more quickly.

Figure 32:
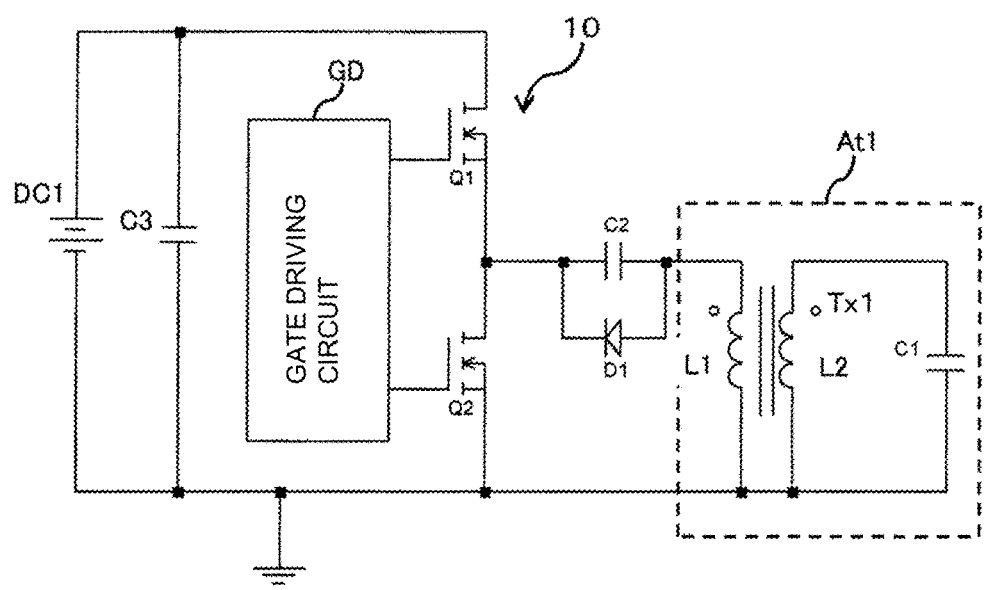
FIG. 32 is a diagram illustrating an example configuration of a magnetic-field generating circuit (including a diode connected in parallel to a bypass capacitor) according to a fourteenth embodiment of the present invention.

For example, as illustrated in FIG. 32, the diode D1 may be connected in parallel to the bypass capacitor C2. At this time, the cathode of the diode D1 is connected to a node between the switch element Q1 and the switch element Q2 of the half-bridge circuit, and the anode of the diode D1 is connected to the high-voltage-side end of the primary coil L1 of the transformer antenna At1.

In the magnetic-field generating circuit having the above-described configuration, the switch element Q2 is short-circuited to release the resonant current after a magnetic-field generation period ends, as described in the twelfth embodiment.

In a case where the half-bridge circuit 10 is used as a driving circuit, the bypass capacitor C2 connected in series to the half-bridge circuit 10 and the antenna At1 is necessary. The bypass capacitor C2 is charged in accordance with the operation of the half-bridge circuit 10. Thus, in a case where the above-described diode D1 is not provided, even if the switch element Q2 is electrically short-circuited to release the resonant current after a magnetic-field generation period ends, the charges accumulated in the bypass capacitor C2 causes DC resonance between the bypass capacitor C2 and the primary coil L1, which may cause an issue that the resonant current does not attenuate quickly. In this embodiment, the diode D1 is provided to solve this issue.

When the switch element Q2 is short-circuited after the magnetic-field generation period ends, a series resonant current Ir is generated by the bypass capacitor C2 and the primary coil L1, and a sine-wave AC voltage V having a peak value of $V=\pm Ir/2\pi fC2$ is generated across the bypass capacitor C2. During the period in which a forward voltage is applied to the diode D1, the resonant current is released to the switch element Q2 through the diode D1, and the resonant current of the primary coil L1 can be quickly attenuated. In this way, when the switch element Q2 is short-circuited after the magnetic-field generation period ends, the resonant current generated between the bypass capacitor C2 and the parallel resonant circuit is quickly released through the diode D1. Thus, the fall time of the resonant current can be significantly shortened.

Figure 33B:
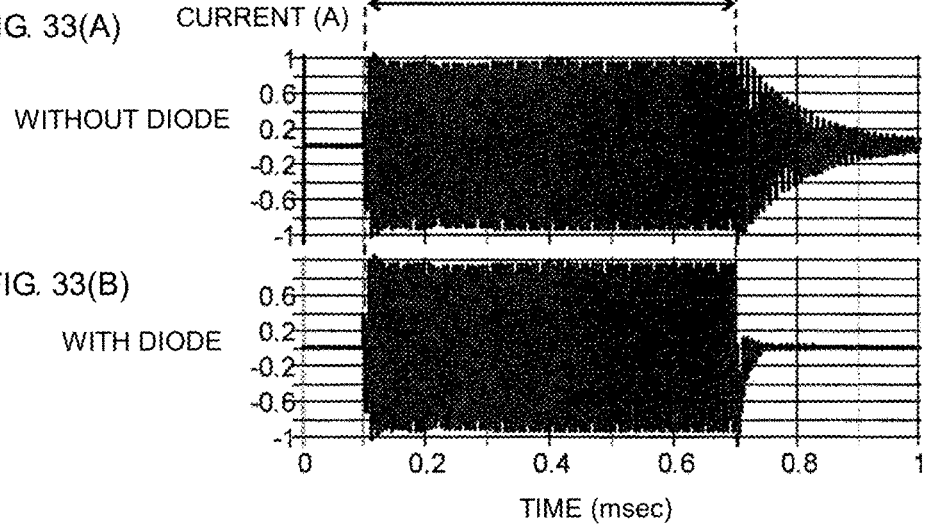

FIGS. 33(A) and 33(B) illustrate simulation results of change in resonant current in a case where the short-circuit control illustrated in the twelfth embodiment is performed in each of the configuration illustrated in FIG. 5 (without the diode D1) and the configuration illustrated in FIG. 32 (with the diode D1). FIG. 33(A) illustrates a simulation result in a case where the short-circuit control illustrated in the twelfth embodiment is performed in the configuration illustrated in FIG. 5 that does not include the diode D1 connected in parallel to the bypass capacitor C2. FIG. 33(B) illustrates a simulation result in a case where the short-circuit control illustrated in the twelfth embodiment is performed in the configuration illustrated in FIG. 32 in which the diode D1 is connected in parallel to the bypass capacitor C2. Both of FIGS. 33(A) and 33(B) illustrate a simulation result of the resonant current of the secondary coil L2 of the transformer antenna At1. In this example operation, a normal ON operation is performed during a period from 0.1 ms to 0.6 ms, and a discharge operation (only the switch element Q2 is ON) is performed during a period from 0.6 ms to 1.0 ms. As illustrated in FIG. 33(A), in a case where the diode D1 is not connected in parallel to the bypass capacitor C2, the degree of attenuation is low at and after 0.6 ms when the magnetic-field generation operation ends, and 400 µs is taken until the resonant current disappears. On the other hand, in a case where the diode D1 is connected in parallel to the bypass capacitor C2 as illustrated in FIG. 33(B), the resonant current quickly attenuates in a short period of about 40 µs.

Fifteenth Exemplary Embodiment

Figure 34:
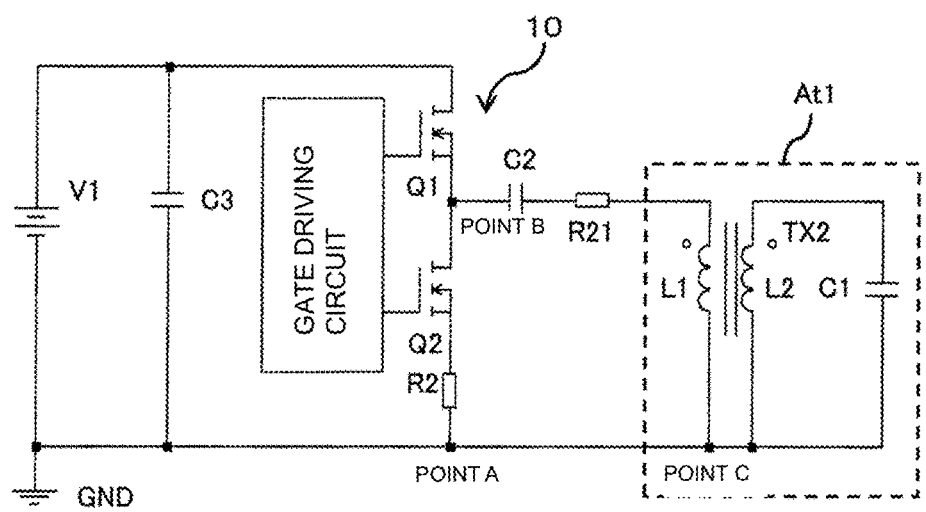
FIG. 34 is a diagram illustrating an example configuration of a magnetic-field generating circuit (including a discharge resistor) according to a fifteenth embodiment.

FIG. 34 illustrates a configuration in which a discharge resistor R21 is added to the magnetic-field generating circuit including the half-bridge circuit 10 and the transformer antenna At1 illustrated in FIG. 5. The discharge resistor R21 is disposed on a path that connects a node (point A) between the switch element Q2 on the low voltage side and a ground node GND at which the ground potential is given, a node (point B) between the switch elements Q1 and Q2, and a node (point C) between the primary coil L1 of the transformer antenna At1 and the ground node GND. Although only one discharge resistor R21 is disposed in the example illustrated in FIG. 34, two or more discharge resistors may be disposed.

During parallel resonance, a very small amount of current flows through the half-bridge circuit 10, and loss in the discharge resistor R21 is small. On the other hand, when a signal generation period ends, the switch element Q1 is opened, and the switch element Q2 is short-circuited, a current that is the turns ratio times the secondary resonant current flows through the above-described path (the path connecting the point A, point B, and point C). Thus, it is possible to perform quick discharge even when the value of the discharge resistor R21 is small and to quickly attenuate the resonant current of the secondary coil L2 of the transformer antenna At1.

Figure 35:
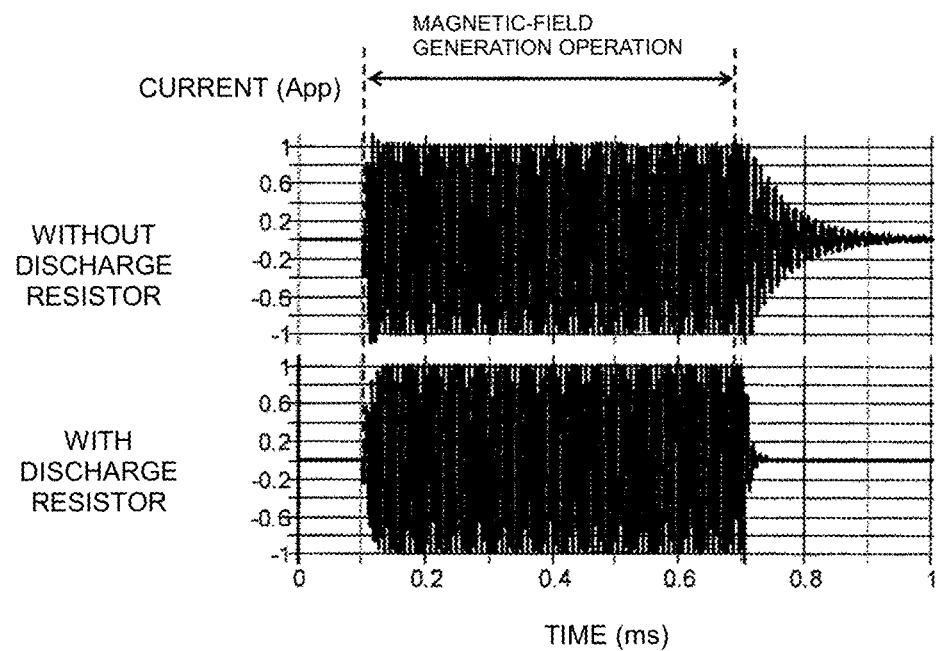
FIG. 35 is a diagram illustrating a simulation result for a resonant current in the magnetic-field generating circuit illustrated in FIG. 34.

FIG. 35 illustrates a simulation result of the resonant current flowing through the secondary coil L2 in cases where there is the discharge resistor R21 and there is not the discharge resistor R21 in the circuit configuration illustrated in FIG. 34. Although there is hardly a difference in waveform during the magnetic-field degeneration period (during a resonance operation), the resonant current quickly attenuated after the magnetic-field generation period ends.

Figure 36:
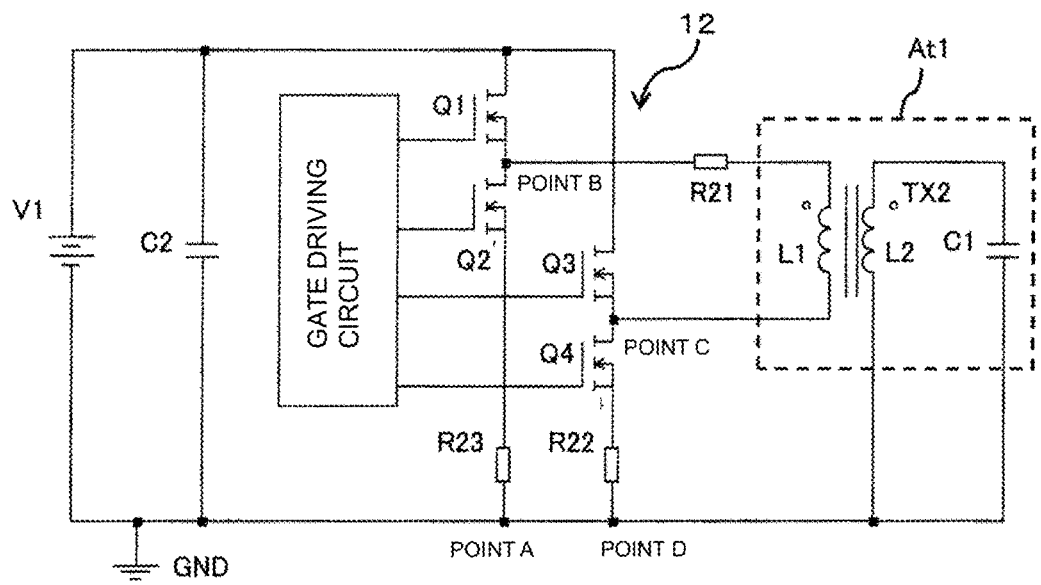
FIG. 36 is a diagram illustrating another example configuration of the magnetic-field generating circuit according to the fifteenth embodiment.

FIG. 36 illustrates a configuration in which discharge resistors R21 to R23 are added to the magnetic-field generating circuit including the full-bridge circuit 12 and the transformer antenna At1 illustrated in FIG. 15. The discharge resistors R21 to R23 are disposed on a current path that connects a node (point A) between the switch element Q2 and the ground node GND, a node (point B) between the switch element Q1 and the switch element Q2, a node (point C) between the switch element Q3 and the switch element Q4, and a node (point D) between the switch element Q4 and the ground node GND. Here, it is sufficient that at least one discharge resistor be disposed on the above-described current path.

Figure 37:
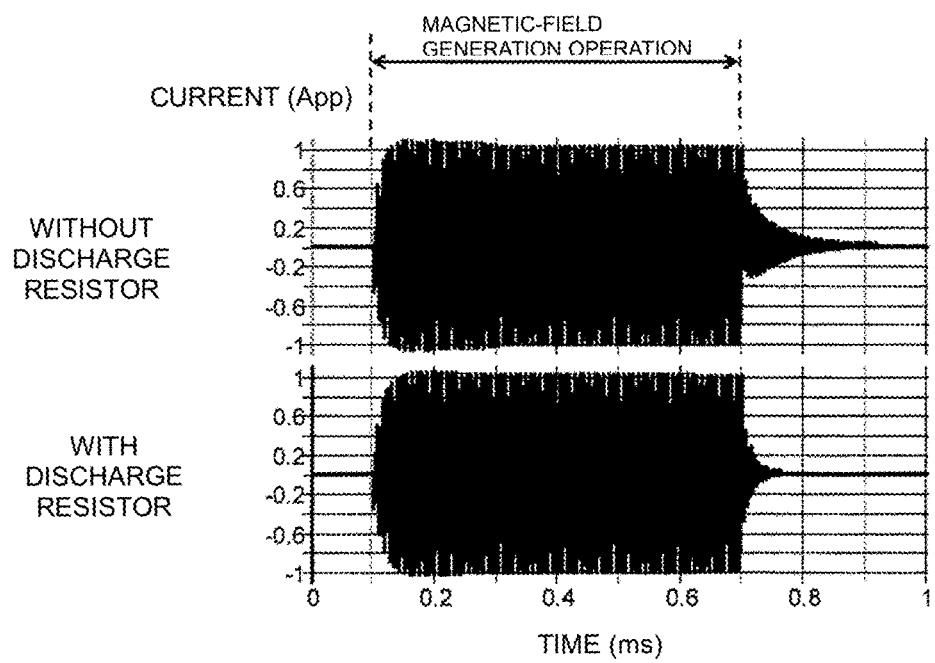
FIG. 37 is a diagram illustrating a simulation result for a resonant current in the magnetic-field generating circuit illustrated in FIG. 36.

FIG. 37 illustrates a simulation result of the resonant current flowing through the secondary coil L2 in cases where there are the discharge resistors R21 to R23 and there are not the discharge resistors R21 to R23 in the circuit configuration illustrated in FIG. 36. Also in the full-bridge circuit 12, although there is hardly a difference in waveform during resonance, the resonant current quickly attenuates after the magnetic-field generation period ends.

Figure 38:
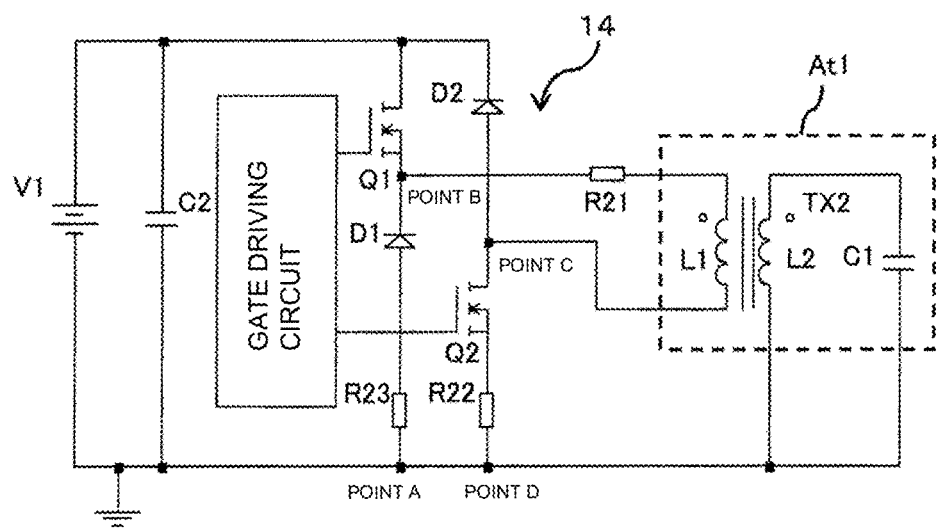
FIG. 38 is a diagram illustrating another example configuration of the magnetic-field generating circuit according to the fifteenth embodiment.

FIG. 38 illustrates a configuration in which the discharge resistors R21 to R23 are added to the magnetic-field generating circuit including the double forward circuit 14 and the transformer antenna At1 illustrated in FIG. 18. Also in this circuit, effects similar to those of the circuit configuration illustrated in FIG. 34 or FIG. 36 are obtained.

Figure 39:
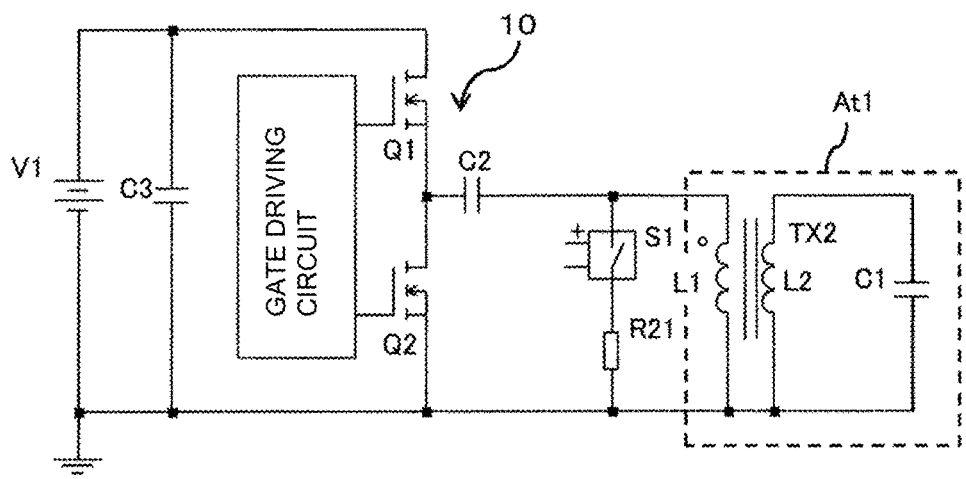
FIG. 39 is a diagram illustrating another example configuration of the magnetic-field generating circuit according to the fifteenth embodiment.

FIG. 39 illustrates a magnetic-field generating circuit in which the discharge resistor R21 is connected in series to the switch S1 for releasing a resonant current in the circuit illustrated in FIG. 28. The configuration in FIG. 39 is the same as the configuration formed by disposing the switch S1 and the discharge resistor R21 in the half-bridge circuit 10 illustrated in FIG. 28. Also in such a circuit, effects similar to those of the circuit configuration illustrated in FIG. 34, FIG. 36, or FIG. 38 are obtained. Also, a discharge resistor may be disposed in the circuit configuration illustrated in FIG. 29 to FIG. 31.

The exemplary embodiments have been described as specific examples of the present invention. However, the present invention is not limited to the above-described embodiments and can be applied to an embodiment obtained by appropriately making a change, replacement, addition, omission, or the like. Any components described above in the first to fifteenth embodiments may be combined to make a new embodiment. That is, the above-described embodiments are for illustrating the technique in the present invention, and thus various changes, replacements, additions, omissions, or the like can be performed within the claims or the scope equivalent to the claims.

REFERENCE SIGNS LIST 10 half-bridge circuit
12 full-bridge circuit
14 double forward circuit
16 push-pull circuit
20 voltage adjusting circuit
AC1 AC power supply circuit
At1 transformer antenna
At2, At3 parallel resonant coil antenna
L1 primary coil of transformer antenna
L2 secondary coil of transformer antenna
C1 resonant capacitor
C2 bypass capacitor
C3 input capacitor
DC1 DC power supply
GD gate driving circuit
R11 current monitoring resistor
SC switch control circuit
Q1 to Q4 switch element
Tx1, Tx2 transformer

The invention claimed is:

1. A magnetic-field generating circuit comprising:
a transformer antenna that includes a transformer including a primary coil and a secondary coil and a resonant capacitor connected in parallel to the secondary coil of the transformer and that is configured to generate a magnetic field; and
an AC power supply circuit configured to supply an AC voltage as a driving voltage to the primary coil of the transformer antenna,
wherein the secondary coil and the resonant capacitor form a parallel resonant circuit having a resonant frequency that is set to be equal to a frequency of the AC voltage supplied by the AC power supply circuit to the primary coil.

2. The magnetic-field generating circuit according to claim 1, wherein the AC power supply circuit is configured to output a sine-wave AC voltage.

3. The magnetic-field generating circuit according to claim 1, wherein the AC power supply circuit includes a DC power supply configured to output a DC voltage, and a driving circuit configured to convert the DC voltage to a rectangular-wave AC voltage having a predetermined frequency and that outputs the rectangular-wave AC voltage.

4. The magnetic-field generating circuit according to claim 3, wherein the driving circuit is one of a half-bridge circuit, a full-bridge circuit, a double forward circuit, and a push-pull circuit.

5. The magnetic-field generating circuit according to claim 3, wherein the driving circuit is a half-bridge circuit that includes a high-voltage-side switch element and a low-voltage-side switch element connected in series to each other between a high-voltage-side output end of the DC power supply and a low-voltage-side output end of the DC power supply, and a bypass capacitor disposed between the primary coil and one of the high-voltage-side switch element and the low-voltage-side switch element.

6. The magnetic-field generating circuit according to claim 3, further comprising a diode connected in parallel to a bypass capacitor coupled in parallel to the driving circuit, such that a cathode of the diode is connected to at least one of the high-voltage-side switch element and the low-voltage-side switch element and an anode of the diode is connected to the primary coil.

7. The magnetic-field generating circuit according to claim 4, wherein the driving circuit is driven at an on-duty ratio within a range of 10% to 45%.

8. The magnetic-field generating circuit according to claim 3, further comprising a voltage adjusting circuit configured to adjust the DC voltage output to the driving circuit when receiving the DC voltage from the DC power supply.

9. The magnetic-field generating circuit according to claim 8, further comprising a current detecting resistor configured to detect a resonant current flowing through the secondary coil, wherein the voltage adjusting circuit is configured to control the DC voltage output to the driving circuit based on a detected value obtained by the current detecting resistor.

10. The magnetic-field generating circuit according to claim 3,
wherein the driving circuit includes a high-voltage-side switch element and a low-voltage-side switch element connected in series to each other between a high-voltage-side output end of the DC power supply and a low-voltage-side output end of the DC power supply, and a gate driving circuit configured to drive the high-voltage-side switch element and the low-voltage-side switch element, and
wherein, after the driving circuit has completed a magnetic-field generation operation, the gate driving circuit is configured to turn on and short-circuit either the high-voltage-side switch element or the low-voltage-side switch element.

11. The magnetic-field generating circuit according to claim 3, further comprising:
a switch connected between a high-voltage-side end of the primary coil and a low-voltage-side end of the primary coil or connected between the low-voltage-side end of the primary coil and a ground potential; and
a switch control circuit configured to control the switch.

12. The magnetic-field generating circuit according to claim 11, wherein, after the driving circuit has completed a magnetic-field generation operation, the switch control circuit is configured to turn on the switch to cause a short circuit between the high-voltage-side end of the primary coil and the low-voltage-side end of the primary coil or to connect the low-voltage-side end of the primary coil to the ground potential.

13. The magnetic-field generating circuit according to claim 12, wherein the driving circuit includes a discharge resistor that is disposed in series in a current path that includes a ground node, a switch element having one end connected to the ground node, and the primary coil of the transformer antenna.

14. The magnetic-field generating circuit according to claim 1, wherein the primary coil and the secondary coil of the transformer antenna are each electrically connected in a same direction to one another.

15. The magnetic-field generating circuit according to claim 1, wherein the primary coil and the secondary coil of the transformer antenna are each directly connected to a ground potential.

* * * * *